United States Patent [19]
Lafuze

[11] 3,902,073
[45] Aug. 26, 1975

[54] STARTER GENERATOR ELECTRICAL SYSTEM UTILIZING PHASE CONTROLLED RECTIFIERS TO DRIVE A DYNAMOELECTRIC MACHINE AS A BRUSHLESS DC MOTOR IN THE STARTER MODE AND TO PROVIDE FREQUENCY CONVERSION FOR A CONSTANT FREQUENCY OUTPUT IN THE GENERATING MODE

[75] Inventor: David Logan Lafuze, Fairview, Pa.
[73] Assignee: General Electric Company, Wilmington, Mass.
[22] Filed: Feb. 7, 1974
[21] Appl. No.: 440,322

[52] U.S. Cl. .................... 290/46; 290/38; 60/39.14
[51] Int. Cl.² .................... F02N 11/04; H02K 23/52; H02P 9/04
[58] Field of Search ............ 290/1, 2, 4, 38, 46, 52, 290/53, 54, 55; 318/136; 60/39.14

[56] References Cited
UNITED STATES PATENTS

| | | | |
|---|---|---|---|
| 2,609,659 | 9/1952 | Price.............................. | 60/39.14 |
| 2,967,252 | 1/1961 | Blake............................. | 307/151 |
| 3,187,188 | 6/1965 | Adkins et al.................... | 290/4 |
| 3,264,482 | 8/1966 | Clark et al...................... | 290/38 |
| 3,591,844 | 7/1971 | Schonebeck et al............ | 290/31 |
| 3,793,826 | 2/1974 | Halleboom et al.............. | 60/39.14 R |

Primary Examiner—Robert K. Schaefer
Assistant Examiner—John W. Redman

[57] ABSTRACT

The instant invention describes a starter-generator arrangement in which a dynamoelectric machine such as a synchronous machine is driven as a brushless DC motor to start a dynamic load such as a jet engine and as a synchronous generator after the jet engine is ignited and brought up to speed. A plurality of cycloconverters utilizing phase controlled rectifier banks are operated from a constant frequency supply source to supply current to the armature windings of the machine. Conduction of the rectifiers is controlled by position sensing elements such as Hall generators, the outputs of which are utilized to generate enabling signals to control conduction of the phase controlled rectifiers to supply current to the proper windings of the synchronous machine armature so that the synchronous machine functions essentially as a DC brushless motor which drives a dynamic load such as a jet engine. As soon as the jet engine comes up to speed, the system is converted and the phase controlled rectifier banks are operated from the output of the synchronous generator to produce a constant frequency 400 Hz output from the varying output of the variable speed generator driven by the jet engine. The system takes advantage of the fact that power can flow through a cycloconverter in either direction by selectively triggering the phase controlled rectifiers either in response to a varying input signal from a dynamoelectric machine operating as a generator and a fixed frequency reference source, or in response to a constant frequency supply voltage and signals representative of the machine rotor position to supply current to the proper armature windings of the machine to provide operation as a motor. The machine thus functions both as a motor and a generator with a minimum total parts, minimum reconnections with a change of modes and a maximum commonality of components.

14 Claims, 9 Drawing Figures

STARTER GENERATOR ELECTRICAL SYSTEM UTILIZING PHASE CONTROLLED RECTIFIERS TO DRIVE A DYNAMOELECTRIC MACHINE AS A BRUSHLESS DC MOTOR IN THE STARTER MODE AND TO PROVIDE FREQUENCY CONVERSION FOR A CONSTANT FREQUENCY OUTPUT IN THE GENERATING MODE

The instant invention relates to a system for controlling a dynamoelectric machine to operate the machine as a DC brushless motor in one operating mode and as a generator system with a constant frequency output in another mode. More particularly, the invention relates to a system in which a control circuit utilizing cycloconverters is operated in such a manner as to drive the dynamoelectric machine as a brushless DC motor in one mode and to provide frequency conversion of a variable frequency voltage from the machine when it operates as a generator to a constant frequency output.

Previously available starter-generator systems usually include a dynamoelectric machine which is operated as a motor to start a dynamic load such as an internal combustion or jet engine. Once the jet engine, for example, is brought up to idling speed, the starter motor is switched out and a constant speed AC generating system is switched into operation and driven by the engine to provide electrical power for the system such as the aircraft in the case of a jet engine.

Alternatively, other systems are known in which a single DC dynamoelectric machine is utilized and windings are switched to allow the machine to operate as a motor in one instance and in a generator in the other. In these presently known prior art systems, either a separate starter machine must be utilized which is then disconnected once the engine is brought up to speed or if winding disconnects are made, the output of the generator is DC which is then converted to AC at the desired frequency. Thus, these prior art systems are cumbersome, complex and very expensive in that separate starter and generating machines must be utilized and switching of the machines and/or major components of the machines are required. These arrangements are therefore in addition to being large, cumbersome and complex, often less than desirable from the reliability standpoint because of the need to switch or reconnect major components of a rotating dynamoelectric machine. A need therefore exists, for an arrangement in which a single dynamoelectric machine system is utilized both as a motor to start an engine such as a jet engine and then is converted to an AC generator which produces a constant output frequency with varying engine speed without requiring major changes in the dynamoelectric machine. Concurrently, a maximum commonality in both operating modes is a highly desirable objective from the standpoint of also using all of the control circuitry in the motoring and generating modes.

Applicant has found that this highly desirable result may be achieved and a starter generator system provided in which the main dynamoelectric machine is a synchronous machine which is operated as a brushless DC motor during the motoring phase and as a synchronous generator during the generating phase. Cycloconverters utilizing phase controlled rectifier banks are selectively controlled by a position sensing means to supply current to the proper windings of the main machine armature. The rectifier banks associated with each of the supply voltage phases are selectively driven into conduction and phase controlled to provide current flow of the proper magnitude into and out of the proper armature windings of the machine as a function of the supply voltage phase and the rotor position. Suitable logic circuitry associated with the rotor position sensors determines which of the individual phase controlled rectifiers in the various banks is fired to supply current to the proper winding where the field flux density is high. Similarly, suitable logic circuitry responsive to the supply voltages generates enabling signals for the various rectifier banks to insure that only the rectifier banks associated with the supply voltage having the proper phase is enabled. Thus, the cycloconverter phase controlled rectifier banks provide the function of commutation or switching of current among the armature windings in response to the position sensing element while in the motoring mode, while the same phase controlled rectifier banks in the cycloconverter are controlled in response to a reference voltage to fire selected ones of the rectifiers in the banks to provide a constant output frequency in the generating mode.

Thus, it can be seen that the same machine and the same cycloconverters are utilized in both modes of operation to control current flow into and out of the selected armature windings during the motoring mode and to provide rectification and inversion during the generating mode to produce a constant frequency output from a variable frequency input from the synchronous generator. Only the rotor position and phase logic circuitry which provides commutation or switching of current among the armature windings are disconnected and modest changes in the exciter configuration which supplies the DC field for the main machine have to be made to convert the system from a DC brushless motor to a synchronous generator.

It is therefore a primary objective of the instant invention to provide a starter-generator system utilizing a common dynamoelectric machine and common cycloconverter control circuitry for controlling distribution of current to the dynamoelectric machine during motoring and for producing a constant frequency output during genrating mode.

Another objective of the invention is to provide a starter-generator utilizing a cycloconverter as the control system for the dynamoelectric machine both in the generating and the motoring mode.

Yet another objective of the invention is to provide a starter-generator system in which a dynamoelectric machine is operated as a brushless DC machine in the motoring mode and as a synchronous generator in the generating mode with a cycloconverter functioning as a commutator or switching means for distributing current to the armature windings in the motoring mode and as a frequency converter in the generating mode.

Still another objective of the invention is to provide a startergenerator utilizing a single dynamoelectric machine both as a motor and a generator which uses a cycloconverter as the control element for the machine in both modes.

Yet another objective of the invention is to provide a startergenerator system utilizing a single dynamoelectric machine which has a maximum of commonality of elements during both modes of operation and is therefore simple and effective to use and manufacture.

Other advantages and objectives of the instant invention will become apparent as the description thereof proceeds.

The various advantages of the instant invention are realized by providing a synchronous type main machine which is operated as a DC brushless motor in the motoring mode and as a synchronous generator in the generating mode. The main machine is controlled by a plurality of cycloconverters having a plurality of phase controlled rectifier banks which operate as cummutating or switching elements during the motoring mode. In the motoring mode, signals representative of the main machine rotor position are processed in suitable logic circuitry to generate signals which control individual rectifiers in the rectifier banks to switch current to the proper armature winding of the main machine. During motoring the rectifiers are energized from a supply voltage of constant frequency (400 Hz, for example, in aircraft use) and the position sensor controlled logic selectively fires rectifiers in the proper phase bank to control the flow of current in and out of selected windings to produce torque. After the jet engine comes up to speed, the system is switched into the generating mode so that the main machine operates as a synchronous generator and the variable frequency output from the generator is supplied to the cycloconverter which functions as a frequency converter to produce a constant frequency output (400 Hz, for example) from the varying frequency generator output. Upon switchover between the motoring and the generating mode, the position responsive logic, the firing and blanking logic controlled by the constant frequency supply voltage are both disabled and the supply voltage is disconnected. A reference wave generator is actuated and used to control conduction of the individual SCR's as a function of the line-to-line voltage and the reference wave signal a constant frequency output from the varying frequency signal from the generator.

The novel features which are believed to be characteristic of this invention are set forth with particularity in the appended claims. The invention itself, however, both as to its organization and mode of operation, together with further objectives and advantages, may best be understood by reference to the following description taken in connection with the accompanying drawings in which:

Figure 1:
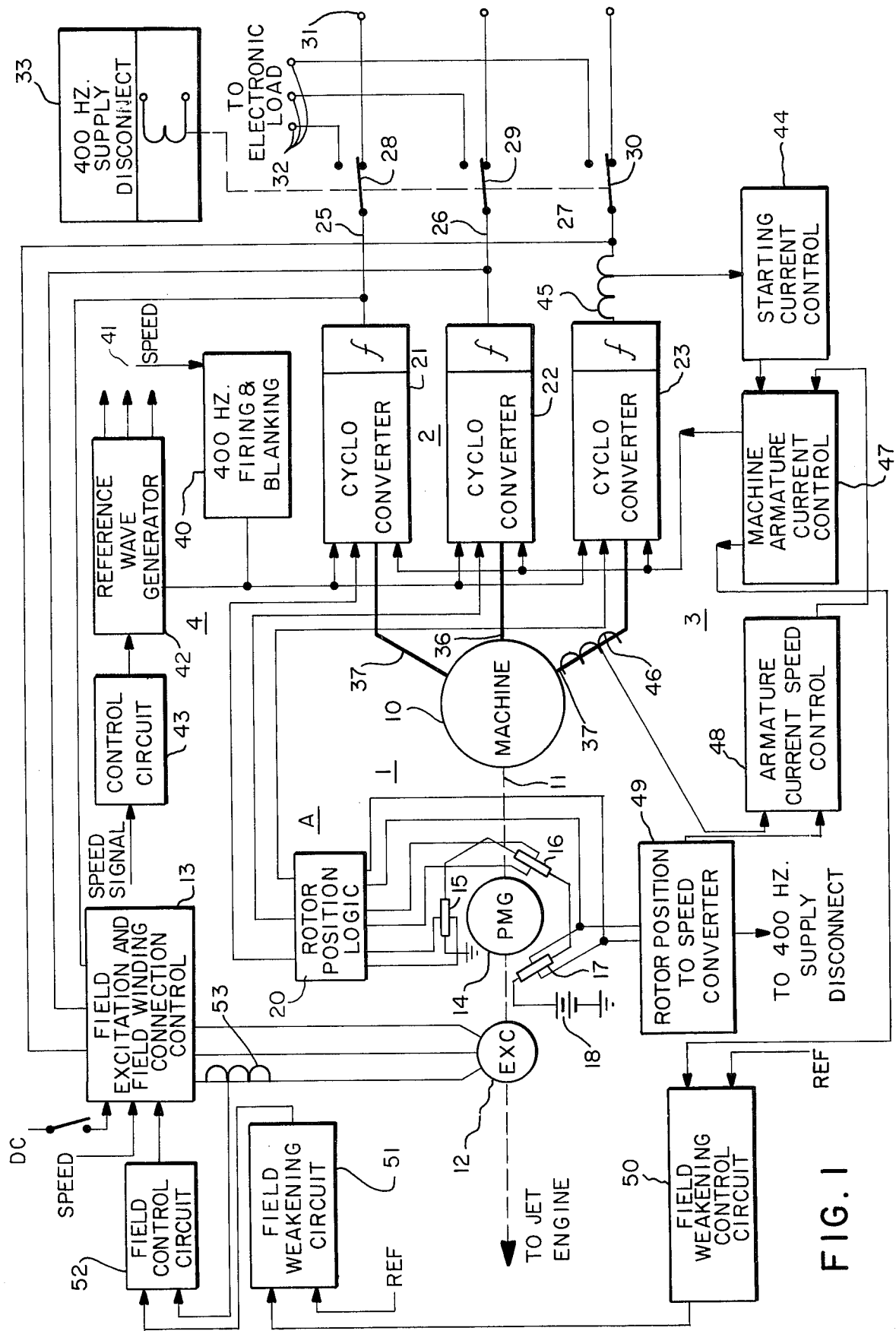
FIG. 1 is a block diagram of the overall starter-generator system utilizing a single dynamoelectric machine and shows the control circuitry for switching current to the proper windings during motoring, controlling the current levels during motoring and for converting the output from the dynamoelectric machine to a constant output frequency during the generating mode.

FIG. 1 is a block diagram of the overall system in which a dynamoelectric machine arrangement is utilized both as a DC brushless motor to drive a dynamic load such as a jet engine and as a synchronous generator to be driven by the jet engine after it has ignited and been brought up to speed. The system consists of four subsystems. The first is the main power chain shown generally at 1 which includes the dynamoelectric machine and its associated energizing elements. The cycloconverters which selectively switch current flow to the proper windings of the main machine during the motoring mode and to convert the variable frequency output from the generator to a constant frequency output during the generating mode is shown at 2. A current control system shown generally at 3 is also provided to control the current level in the machine during motoring operation by sensing both input current and machine current to control the firing angle of the rectifiers in the cycloconverters to control the armature current during the motoring mode. The current control system includes means for sensing the current level in the machine to maintain the current at the desired level as well as means for weakening the field of the main machine to maintain the system in the motoring mode up to a predetermined speed. The fourth major subsystem includes the control circuits for firing the cycloconverter rectifiers in the proper sequence to switch current to the proper armature windings as a function of rotor position and supply during the motoring mode and to control phase advance and retard of the same rectifiers during the generating mode to produce a constant frequency output from the variable frequency input.

The main power chain consists of a main machine 10 on a shaft 11. Main machine 10 is preferably a synchronous machine having DC field windings mounted on the rotor and a six phase armature mounted on the stator. Mounted on the same shaft as main machine 10 is an exciter generator 12 which has armature windings on the rotor and field windings on the stator. The exciter field windings are the only elements of the system which are modified in switching between the motoring and the generating modes. The exciter field is connected in a three phase WYE connection and energized from an AC source through a field excitation and field winding connection control circuit 13 during the motoring mode and connected in series and excited from a DC source to function as an inside-out synchronous generator during the generating mode.

The manner in which the exciter field windings are modified in switching between the motoring and generating modes is described and claimed in a contemporaneously filed application for U.S. Letters Patent entitled: A Field Excitation System for Synchronous Machines Utilizing a Rotating Transformer/Brushless Exciter Generator Combination Ser. No. 440.516 filed Feb. 7, 1974 in the name of Lawrence Waters Messenger and assigned to the General Electric Company, the assignee of the present application.

The voltages induced in the rotor winding of exciter 12 are rectified in a rectifier bridge, not shown, mounted on or within the shaft to provide DC excitation for the main machine. Also mounted on shaft 11 is a permanent magnet generaator (PMG) 14 having a rotor consisting of a plurality of permanent magnet pole pairs and an armature winding mounted on the stator. The PMG provides the DC field excitation for exciter 12 during the generating mode and provides a means for determining the rotor position of the main machine during the motoring mode with the rotor position being utilized to control switching of current to the armature windings by the cycloconverter system 2. To this end, three Hall generators 15, 16 and 17 mounted in the air gap of the PMG are spaced 120 electrical degrees apart with respect to the permanet magnet pole pairs and in magnetic flux sensing relationship to the rotor permanent magnets. The Hall generators are energized by applying a voltage from a DC source 18 across one pair of faces of the Hall material. A voltage is generated across the Hall element which is proportional to the magnetic flux density applied to the Hall element. Thus, as rotor of PMG rotates, the voltage across the respective Hall generators varies from 0 to a maximum as a function of the flux density thereby generating three trapezoidal voltages spaced 120 electrical degrees apart. The output from the Hall sensors are thus representative of the position of the PMG rotor. If the rotor of the PMG is constructed to have the same number of pole pairs as the main machine and the poles on the PMG are aligned with the poles of the main machine, the main machine rotor position is known if the PMG rotor position is known. Thus, the output signals from the Hall Elements 15–17 may be used to control switching of the gated elements in the cycloconverters to switch current to the proper winding in the armature of the main machine.

To this end, the three output signals from the Hall sensors are applied to a rotor position logic network shown generally at 20 which converts the varying Hall voltages to six enabling signals of 120° duration to control the conduction interval of the six rectifiers in each bank. These rotor position logic signals are applied over suitable leads to the individual cycloconverters forming part of the cycloconverter assembly 2.

Cycloconverter assembly 2 consists of three cycloconverters 21, 22 and 23 along with the associated output filters which are connected through leads 25, 26 and 27 and a speed controlled switch, shown for the sake of simplicity as three single pole double throw switches 28, 29 and 30, either to a source of 400 Hz supply voltage at the terminals 31 or to an electrical output load connected to the terminals 32. The single pole double switches are controlled by a Supply Disconnect Network 33 which positions the single pole double throw switches to connect the cycloconverters to the source 400 Hz supply voltage when the system is in the start mode. When the main machine 10 has brought the jet engine up to idling speed, Supply Disconnect Network 33 repositions the single pole double throw switches to disconnect the constant frequency supply source from the converters and to couple the output of the cycloconverters to the electrical load which receives the constant frequency output signal during the generating mode.

Each cycloconverter 21–23, as will be described and shown in detail later, consists of two banks of oppositely poled silicon controlled rectifiers which are selectively gated to control their conduction interval. Each bank consists of six rectifiers, one for each of six windings of the six phase armature. Oppositely poled rectifier banks are provided for each supply phase to allow flow of current into and out of the respective windings during the motoring mode and to provide current during rectification and inverting mode of the machine when operating in a generating mode.

The various inputs to the cycloconverters are therefore leads 35–37 from the main machine armature windings, shown as a three-phase output although in actuality for a six phase machine, each of the outputs is a pair of windings from the corresponding pair of armature windings in the machine. That is, in a six phase machine, the voltages in complementary pairs of windings are 180° out of phase. Thus, phase 1 and phase 4 of a six phase machine are 180° out of phase so that at any given time the corresponding rectifiers in a positive and negative bank of the converter will be conducting at the same time to permit current flow into one winding of the pair and out of the other winding of the same pair. The cycloconverters are also supplied with the output from the Rotor Position Logic Network to determine which of the SCR's in any given bank is to be fired and which of the armature windings is to be supplied with the current. Simultaneously, each of the cycloconverters is supplied with a firing and blanking wave from the firing and blanking wave circuit 40 to ensure that firing or triggering pulses are supplied to the SCR's in any given bank only when the polarity of the voltage across that SCR in a given bank is proper. To this end, firing and blanking wave network 40 is supplied by the 400 Hz supply voltage and generates suitable blanking waves for each of the cycloconverters depending on the phase of the supply voltage. Firing and blanking network 40 is operative to provide the firing and blanking signals only during the motoring mode of the machine. Whenever the system switches to the generating mode, firing and blanking network 40 is disabled in response to a speed control signal impressed on a disable terminal 41. Simultaneously, reference wave generator 42, which is normally disabled by control circuit 43 during the motoring mode is coupled to the cycloconverters and supplies a reference wave signal. The signal from Reference Wave Generator 42 is compared in the cycloconverter to the integral of the machine line-to-line voltage to produce the triggering pulses for the individual rectifiers which control the conducting intervals so as to produce a constant frequency output from the variable frequency input signal of the main machine. Control circuit 43 which normally disables reference wave generator 42 is controlled by a speed signal so that when the main machine reaches a certain speed, a speed at which the machine converts from the motoring to the generating mode, the firing and blanking wave generating circuit 40 is disabled and the constant frequency reference wave generator 42 is enabled to take over control of the cycloconverters.

The firing sequence of the individual rectifiers in the cycloconverter rectifier banks is also controlled by a fourth signal which varies the firing point and hence, the phase angle of the rectifiers in the banks as a function of the current in the machine during the motoring mode. To this end, the current sensing and control chain illustrated generally at 3 initially regulates the current level as a function of input current from the supply source to the cycloconverters and thereafter, as the starter picks up speed, controls the current level both in response to the machine stator current level and machine speed. As the machine increases in speed thereby increasing the counter EMF generated in the stator windings of the main machine, a point is eventually reached at which the counter EMF equals the supply voltage so that under normal circumstances, no armature current would flow. At this point, the current control network 3 introduces field weakening, i.e., reduces the magnitude of the field of the main machine thereby reducing the counter EMF and allowing armature current to flow from the supply source at higher speeds than would be normally possible. In addition, the current control source also operates to control the field excitation of exciter 12 to maintain the exciter current constant as the speed increases to avoid overheating. when the machine is at a standstill and at very low speeds, it is difficult to measure the machine current and hence it is difficult to use the actual machine current levels as the control parameter to maintain the current level at a desired value by controlling conduction in the cycloconverters. Thus when the machine is at a standstill, the current in the machine windings is DC and therefore difficult to measure at low speeds, the AC current is at a very low frequency and consequently also difficult to measure. To avoid these difficulties a starting Current Control Network 44 is provided which senses, by means of a current transformer 45; the incoming 400 Hz current from the supply source compares it with a reference current and provides an error signal which is applied to a Machine Armature Current Control Network 47. Network 47 provides a control voltage which is applied to the cycloconverters to vary the current level of the cycloconverter. Machine Armature Current Control Network 47 is also controlled in response to an Armature Current/Speed Control Network 48 which senses the machine armature current and the speed of the machine to override the effect of Starting Current Control Network 44 whenever the armature current and the machine speed reaches a predetermined level. When Starting Current Control Network 44 is disabled, Machine Armature Control Control Network 47 produces control signals for the cycloconverter solely in response to the machine armature current and machine speed. To this end, machine armature current is sensed by a suitable armature current transformer 46 coupled to one of the main machine output lines and applied as an input to network 48. It will be appreciated that although but a single current transformer is indicated that the signal representative of the armature current may be taken from all of the armature windings to present an average armature current at the regulating element.

The other input to Armature Current Speed Control Network 48 is from Rotor Position to Speed Converter 49 in which is coupled to the output of one of the Hall devices associated with the PMG generator. That is, the voltage from the Hall generators represent the position of the PMG rotor. By suitably processing these position signals, as by differentiation, for example, the speed of the rotor may be sensed and the speed signal is utilized to control the armature current level and is also utilized to disable the various logic networks whenever the speed of the machine is sufficiently high to switch operation from the starting to generating mode.

As the speed of the machine increases in the starting mode, the counter EMF generated in the armature windings of machine 10, which is functioning as brushless DC motor, rises until it is equal to or higher than the supply voltage. As a result, no current flows into the armature windings to maintain positive torque on the output shaft. At this time, the output from Machine Armature Current Control Network 47 applies a control signal to a Field Weakening Control Circuit 50 which normally maintains Field Weakening Circuit 51 in a disabled state. Field Weakening Control Circuit 50 now permits Field Weakening Circuit 51 to operate and produce an output signal which is applied to the Field Control Circuit 52 which varies the energizing voltage to Field Excitation Network 13. By reducing the voltage to Field Excitation Circuit 13, the field excitation for the exciter 12 is reduced as is the rectified output from the exciter. This reduces the field excitation for the main machine field reducing the counter EMF of the machine and permitting current to be switched into the armature windings and thereby continuing to produce positive torque for shaft 11 which drives the jet engine.

Field Control Circuit 52 is also controlled to maintain the field excitation of exciter 12 constant in the absence of the field weakening. That is, one input to Field Control Circuit 52 from current transformer 53 coupled to the exciter field windings and which senses the current supplied to the exciter. Field Control Circuit 52 maintains field excitation constant by maintaining constant field current for exciter 12. The reason for the regulation of the field current is that as the speed of the exciter increases, the effective impedance of the exciter goes down. As a result, if a constant voltage were applied to the field winding, the field current would go up, increasing the output of the exciter and increasing the excitation applied to the main rotor field. Since the main rotor field is already at saturation, the exciter simply pumps more current into the synchronous machine field resulting in heating of the machine. Consequently, as the speed of the machine goes up and its impedance goes down, tending to increase the current flow, the current flow in the exciter is sensed and the field control circuit produces a control signal which reduces the excitation to maintain the current constant as the machine increases in speed from standstill to its operating speed.

In summary, the starter generator circuit illustrated generally in block diagram in FIG. 1 consists of a main machine which is of a synchronous construction, an exciter generator for supplying field excitation for the main machine and a permanent magnet generator which supplies DC excitation for the exciter during the generating mode and is also utilized to provide position sensing of the main machine rotor. The position sensing of the main machine rotor is achieved by means of suitably positioned Hall generators which produce voltages which are then converted in suitable logic to control the rectifiers in the cycloconverters 21–23 to switch current to the proper armature windings of the main machine. In this fashion, the main machine is operated as a brushless DC generator with the cycloconverter rectifier banks operating as commutating or switching means to supply current to the proper armature windings in response to the rotor position as sensed by the Hall devices associated with the PMG's. During the motoring mode, therefore, the cycloconverters function as switching or commutating elements to produce current conduction in the proper armature windings of the main machine to sustain motoring and apply positive torque to the output shaft to drive the jet engine. During the motoring mode, the current level in the main machine is also controlled by means of a current control loop which initially controls the current level in the main machine in response to the incoming supply current and thereafter control of the current level is taken over by a circuit which senses the current actually flowing in the machine armature as well as the speed of the machine. As the machine speed increases the counter EMF generated in the machine reaches a level which would reduce the armature current and hence, the torque to zero. At this time, field weakening is initiated to reduce the counter EMF and to continue to apply positive torque to the jet engine. In addition, field excitation to the exciter which supplies excitation to the main machine field winding is controlled to maintain constant excitation with speed to avoid overheating of the main field windings.

After the machine reaches a predetermined speed when it must convert from a starting (motoring) to a generating mode, signals are generated which disable the logic networks which control the cycloconverters to switch current between armature windings as a function of rotor position. The constant frequency supply voltage is disconnected from the cycloconverters and the field windings for the exciter are reconnected. DC excitation is applied to the exciter to operate it as a synchronous exciter-generator. A reference wave generator is coupled to the cycloconverters so that the cycloconverters now function as frequency converters to convert the varying frequency output from the main machine which is now being driven by the jet engine to a constant frequency output.

Figure 2:
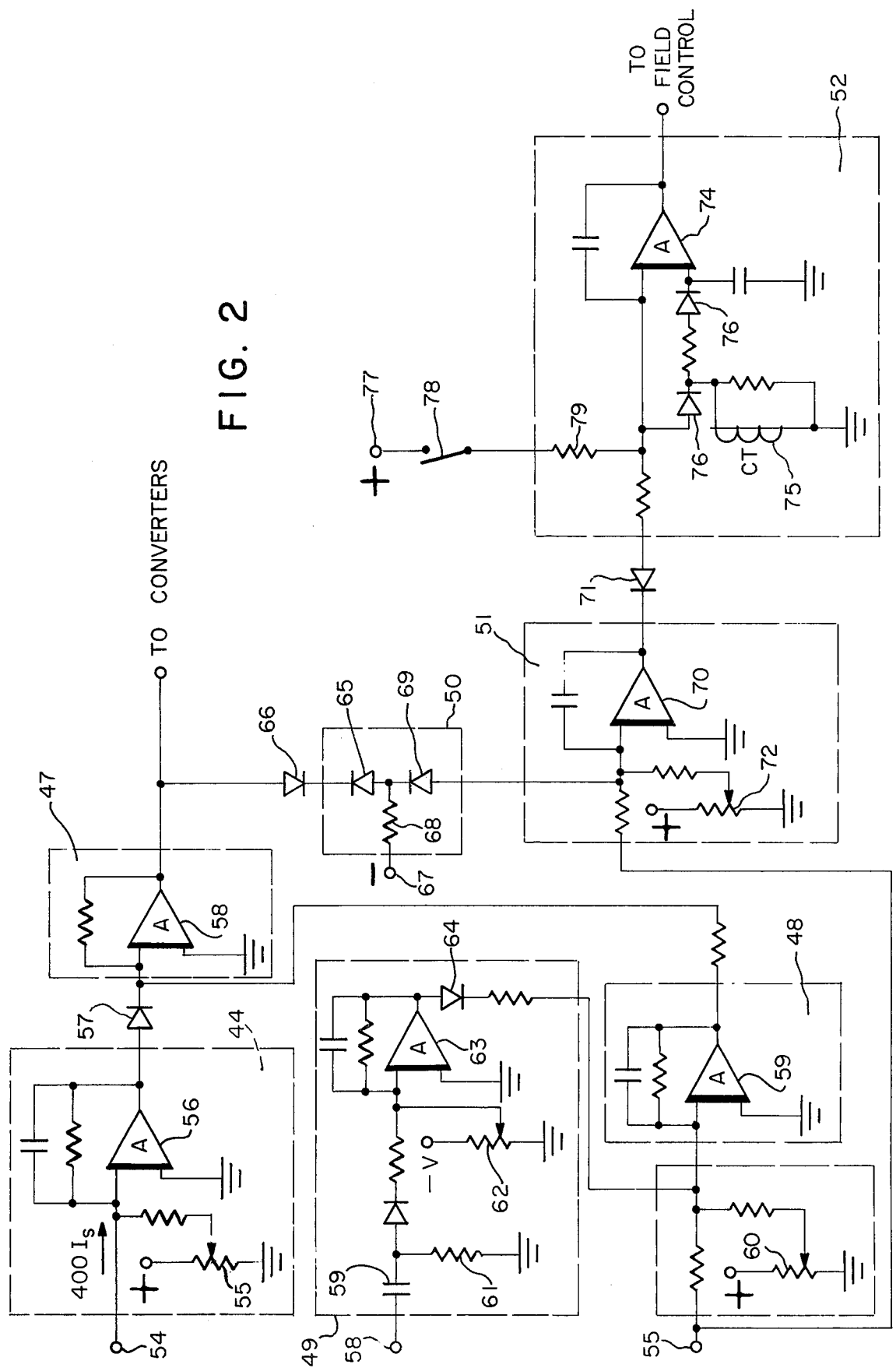
FIG. 2 shows schematic circuit diagrams of that portion of FIG. 1 circuit which controls the current level in the machine and the field excitation of the system.

FIG. 2 illustrates the current control network shown in block diagram form in FIG. 1 in which the current level in the main machine is controlled by controlling the firing of the rectifiers in the cycloconverters in response to an error signal generated in the current control loop. In FIG. 2, similar network components are identified by the same numerals as utilized in connection with FIG. 1. Thus, Starting Current Control Network 44 has an input signal applied to an input terminal 54 which is proportional input current to the cycloconverters. The input is compared to a reference signal from the potentiometer 55 and the two signals are added algebraically and applied as one input to an operational amplifier 56 to produce an output or error signal which is proportional to the difference between the level of the 400 Hz input current and the reference current. The error signal proportional to the difference is applied through rectifier 57 as one input to Machine Armature Current Control Network 47. Machine Armature Current Control Network 47 includes an operational amplifier 58 having the error signal applied to its input terminal and its output coupled to the firing and blanking logic network of the cycloconverters. Thus, the error signal is compared with a firing wave in the firing and blanking circuits or with the reference wave in the modulator to produce triggering pulses which fire the SCR's at a proper angle to produce the desired current level.

On starting and at low speeds, the counter EMF generated in the main machine is very low, and thus maximum armature current can flow and can be commutated by the SCR's. Hence, the output from the starting current control network 44 is set so as to produce a high level of current initially and the setting on potentiometer 55 is such that a high current output is produced from the cycloconverter. However, since network 44 only provides an indirect measure of the armature current level, since the supply current is being measured, it is desirable to switch current control of the cycloconverters through actual measurement of the armature current as soon as possible. Consequently, the effect of Starting Current Control Network 44 is overriden as the machine goes up in speed by disabling this network and by controlling Machine Armature Current Control Network 47 in response to a network which senses the machine armature current directly. Armature Current/Speed Control Network 48 is coupled to the junction of diode 57 and network 47 and will, in the manner presently to be described, disable network 44 whenever the combination of the armature current and the machine speed reaches a predetermined level. Armature Current/Speed Control Network 48 is controlled in response to the armature current and a signal proportional to the speed of the machine. The Rotor Position to Speed Converter Network 49 thus constitutes one input to network 48 and a signal proportional to measured armature current constitutes another input which is compared to a reference signal to produce an output signal which disables Starting Current Control Network 44. A signal proportional to armature current is applied as one input to the inverting input terminal of operational amplifier 59 in Network 48. Also connected to the input of operational amplifier 59 is a reference signal from a reference potentiometer 60 which represents the reference armature current level. A signal representative of the machine speed is supplied from Rotor Position to Speed Converter 49 and the three signals are added algebraically and produce an output signal from operational amplifier 59 which is utilized to override and disable Starting Current Control Network 44. The Rotor Position Signal from the Hall sensor is applied to an R-C differentiation network 61 which is coupled along with a negative reference voltage from potentiometer 62 to the inverting terminal of operational amplifier 63. At standstill or low speeds, the reference signal is large compared to the speed signal from differentiation network 61 and the amplifier output is highly positive. With a highly positive voltage applied to the inverting terminal of operational amplifier 59 in network 48, the output of amplifier 59 is highly negative. As the machine speed goes up, the speed signal from rotor position to speed converter network 49 becomes less positive. That is, the differentiated signal becomes more positive as speed increases. It thus counters the negative reference voltage from potentiometer 62 and the output of operational amplifier 63 becomes less positive. As the positive speed signal to operational amplifier 59 in armature current/speed control network 48 is reduced, the algebraic sum of the speed signal, the armature current signal and the reference signal from potentiometer 60 applied to the inverting input of operational amplifier 59 becomes relatively more negative and the output of amplifier 59 becomes more positive. For some combination of speed and armature current the output of Armature Current/Speed Control becomes more positive than the output of Starting Current Control Network 44, reverse biasing diode 57 and thereby disconnecting network 44 from Machine Armature Current Control Network 47. Current level control of the cycloconverter is thus switched from the Starting Current Control Network which is responsive to supply current level to the Armature Current/Speed Control Network. Thereafter, the current level supplied to the armature windings by the cycloconverters is controlled as a function both of the current level in the machine armature and the speed of the machine.

As the speed of the machine increases, the counter EMF in the machine rises until at some speed which is still less than the idling speed of the jet engine it exceeds the supply voltage. When this occurs the supply voltage can no longer force enough current through the armature windings to satisfy the control loop requirements. In other words, the accelerating torque is reduced until eventually there is insufficient torque to accelerate the engine further. It is therefore necessary to initiate field weakening for the main machine by reducing the excitation for the exciter 12. By reducing the excitation for the exciter which is operating as a rotating transformer, the rectified output applied to the main field is reduced and this, in turn, reduces the counter EMF in the machine until it is sufficiently lower than the supply voltage to drive. Current into the armature windings so that positive torque continues to be supplied to the output shaft which drives the jet engine. To this end, Field Weakening Network 51 must begin to modify the field reference voltage from input terminal 77 to reduce the regulated field current.

The Field Weakening Control Circuit 50 which normally maintains network 51 in the disabled state comprises a zener diode 65 connected through diode 66 to the output of operational amplifier 58 of Machine Armature Control Network 47. The output from operational amplifier 58 is normally of such polarity and level that zener diode 65 does not break down and does not conduct. Consequently, a source of negative voltage at a terminal 67 is applied through resistor 68 and diode 69 to the inverting input terminal of operational amplifier 70 in Field Weakening Circuit 51. Diode 69 is so poled that it is forward biased by the voltage at terminal 67 and applies the negative voltage at terminal 67 to the inverting terminal of operational amplifier 70. A positive field weakening reference voltage from potentiometer 72 is also applied to the input of operational amplifier 70. However, under normal circumstances, the negative voltage applied from Field Weakening Control Circuit 50 is sufficient to overcome the reference voltage so that the output of operational amplifier 70 is highly positive. With the amplifier output positive, the output of Network 51 is blocked by a diode 71 which is so poled as to block positive voltages thereby disconnecting network 51 from Field Control Circuit 52.

When the machine speed increases the armature current drops because of the higher counter EMF. The output from network 47 increases in an attempt to increase the armature current. When the counter EMF of the machine is almost equal to or greater than the applied voltage and the armature current goes below the desired regulated value, the output of operational amplifier 58 in Machine Armature Current Control Network goes to its maximum positive value. The output voltage from operational amplifier 58 is sufficiently positive to break down zener diode 65 and apply a positive voltage to diode 69. This voltage is sufficiently positive to drive diode 69 into non-conduction thereby disconnecting the negative voltage at terminal 67 which has been clamping the input of operational amplifier 70 at a negative potential. The input to operational amplifier 70 is now the algebraic sum of the reference signal from potentiometer 72 and the signal representative of the armature current. The armature current is compared to the reference voltage to produce an output signal which is coupled through diode 71 to the inverting input of operational amplifier 74 in Field Control Circuit 52. The signal controls the field excitation network of the exciter to weaken the field excitation of the main machine to reduce the counter EMF and allow flow of armature current in the main machine.

Also coupled to the inputs of operational amplifier 74 is circuitry for maintaining the exciter field excitation constant with the speed. As pointed out previously, as the machine comes up to speed, the exciter impedance goes down and if a constant voltage to be applied to the exciter its output would increase and, in turn, increase current in the main machine. Since the main machine field is normally saturated the additional current would merely result in additional heating. Thus, a signal representative of the exciter generator field current is provided from a current transformer 75 and applied through the diodes 76 to the inverting and non-inverting inputs of operational amplifier 74. Also coupled to the inverting output of operational amplifier 74 is a DC reference voltage from the terminal 77 which is connected through a single pole double-throw switch 78 and a resistor 79 to the non-inverting terminal. The DC reference voltage thus establishes the desired current level and if the actual current in the field windings of exciter 12 exceeds this level an error signal is produced to reduce the field excitation to the exciter to maintain the current constant with speed. In addition, when the speed reaches a value at which the counter EMF approaches the applied voltage and the armature current drops to a low value, field weakening is initiated through Field Weakening Circuit 51 to reduce the main machine field and the counter EMF in the armature windings thereby allowing the machine to continue to produce positive torque.

In this fashion, the current control system operates to control the armature current in the machine at standstill and at low speeds in response to the current flowing in the supply lines to the cycloconverter. Thereafter, as the machine comes up to speed, current control is taken over in response to machine armature current and machine speed. Finally, when the speed of the machine reaches a value at which the counter EMF equals or is greater than the supply voltage, circuitry is actuated to initiate field weakening to reduce the counter EMF and maintain the machine in the motoring mode and producing positive torques at speeds at which the machine would normally cease to produce torque.

PHASE CONTROLLED CYCLOCONVERTER RECTIFIER BANKS

Figure 3:
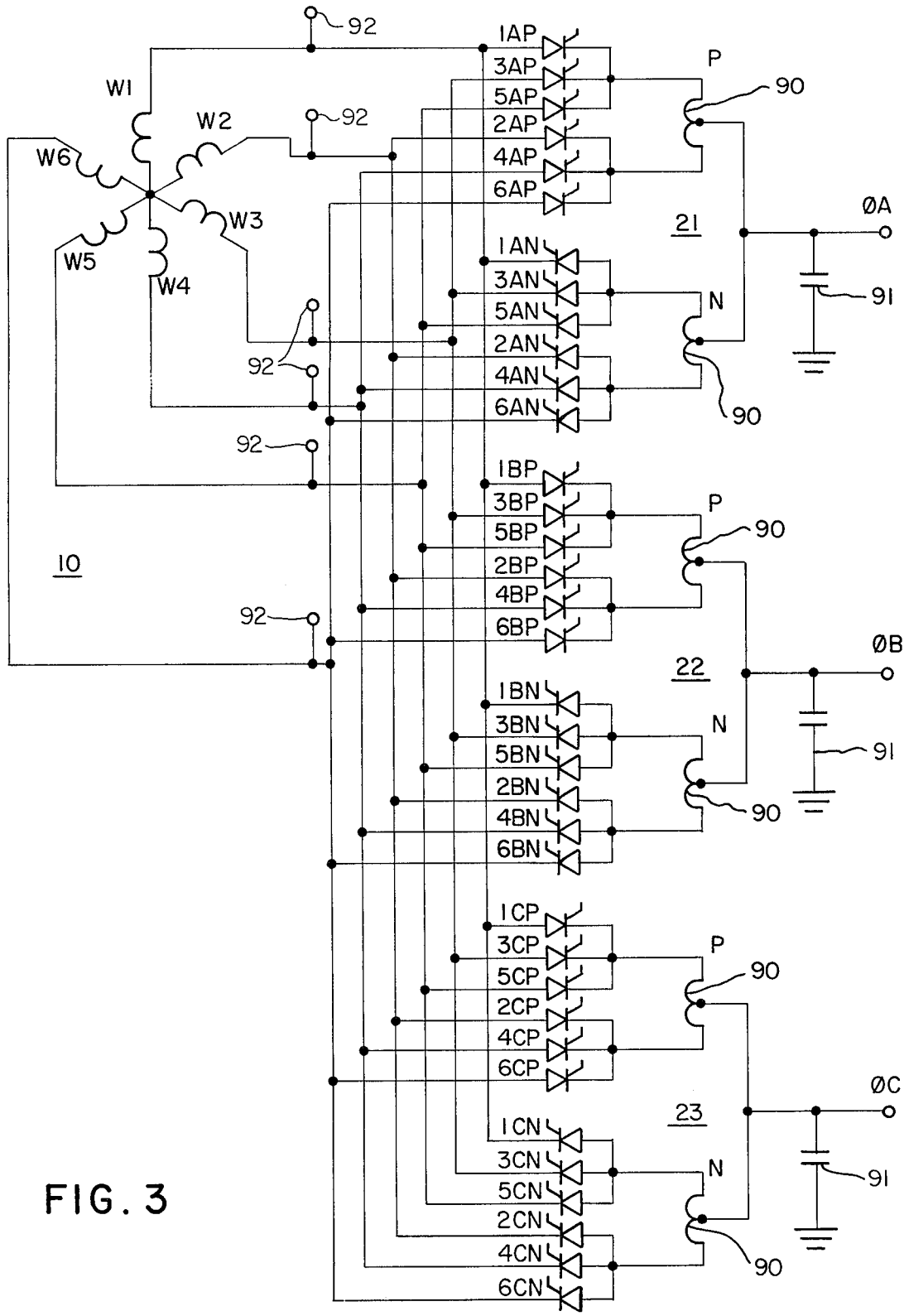
FIG. 3 is a schematic circuit diagram of the machine armature windings and the phase controlled rectifier banks constituting the cycloconverters associated with the machine.

The phase controlled rectifier banks which make up the cycloconverters that control the flow of current into and out of the armature windings during starting and which perform the frequency conversion during the generating mode are shown in detail in FIG. 3. Thus, the main machine 10 is shown as a six-phase machine having six phase windings $W_1$–$W_6$. The windings are so distributed around the armature 50 that windings 1 and 4, 3 and 6 and 2 and 5 constitute complementary winding pairs which are 180° out of phase. Thus, when current flows into $W_1$ from the supply source, current simultaneously flows out of winding $W_4$ into the supply. Winding pairs 3–6 and 2–5 operate in a similar manner so that when current flows into one winding of a complementary pair, current simultaneously flows out of the other winding and vice versa. For purposes of further discussion, the following convention is employed in discussing the flow of current into and out of the machine windings and the rectifiers and rectifier banks which control the current. Thus, when current flows from the generator windings to the supply source the current flow is considered positive (P) and the SCR switches are identified as positive or P-switches and the rectifier bank is identified as a P bank. Current flow, into the generator from the supply, on the other hand, is considered negative (N) and the SCR switches are identified as negative or N-switches and the rectifier bank is identified as an N-bank. During the starting mode therefore, when the dynamoelectric main machine is operated as a brushless DC motor, current is supplied to the individual windings in the proper sequence to supply current to that armature winding where the flux density is high in order to produce torque from the motor. Thus, at any point in time, one of the windings associated with the armature of the main machine has current supplied thereto from one of the supply phases, i.e., that supply phase which is positive with respect to the preceding conducting phase, while the complementary winding of the pair has current flowing out of it into that phase of the supply source which is negative with respect to the previously conducting phase.

The flow of current into and out of the armature windings $W_1-W_6$ is controlled by banks of phase controlled silicon rectifiers (SCR's) which constitute cycloconverters 21, 22 and 23 associated with the inputs supply phases A, B, and C. Each current controlling cycloconverter 21–13 consists of a positive (P) rectifier bank and a negative (N) rectifier bank coupled through a filter consisting of the interphase transformer 90 and a shunt capacitor 91 to an input terminal to which one phase of the supply voltages A, B and C is coupled. The positive and negative rectifier banks each include n rectifiers where n is the number of machine phase. Thus, each bank in this instance includes six SCR's which are coupled between the filter and the armature windings to supply current selectively to the armature windings $W_1-W_6$. Thus, in cycloconverter 21 associated with Phase A, the positive rectifier bank P includes 6 SCR's, 1AP–6AP which are so poled that current can only flow from the armature winding through the rectifiers and to the input supply terminal. The negative rectifier bank N also contains 6 SCR's, 1AN–6AN which are oppositely poled so as to conduct current in the opposite direction, i.e., current flowing from the input supply source through the rectifiers and into the armature windings. Each of the SCR's 1 through 6 in each bank is connected to one of the armature windings with the numeral of the SCR identifying the winding to which it is connected. Thus, SCR 1AP indicates that this SCR is in the A phase, the positive bank and is connected to armature winding $W_1$. SCR 1AP will therefore conduct and allow current to flow from winding $W_1$ to the supply source terminal and shut off the previously conducting SCR only if the A phase is more negative than the preceding phase, namely Phase C at the time of its initial gating and if the position rotor logic indicates that the rotor pole and hence, field flux adjacent to winding $W_1$ is high. All of the remaining rectifiers in the positive bank are triggered selectively to allow current to flow out of the remaining armature windings when the rotor position logic indicates that the field flux adjacent to that particular winding is high.

The SCR's in the negative bank of cycloconverter 21 are poled in the opposite direction so that they can be triggered into conduction only when the associated phase voltage is positive with respect to the preceding phase. Thus, SCR 1AN in the negative bank of cycloconverter 21 will conduct to supply current into winding $W_1$ only when the A phase is more positive than the C phase and the rotor logic has indicated that the field flux at winding $W_1$ is high. The positive and negative rectifier banks associated with cycloconverters 22 and 23 which are coupled to the B and C phases respectively, similarly include rectifiers which are identified as 1BP–6BP and 1CP–6CP for the positive rectifier banks and 1BN–6BN and 1CN–6CN for the negative rectifier banks of these two cycloconverters.

All of the 1 SCR's whether in the positive or negative banks and whether in the A, B, or C phases are connected to the armature winding $W_1$ so that armature winding $W_1$ can have current driven into it from the supply source. Every rectifier identified by the same numberal is thus connected to that numbered winding of the main dynamoelectric machine so that current conduction for any given winding can be readily transferred from phase to phase of the supply voltage.

It will also be appreciated that when current is flowing into one winding from the negative bank, current must be flowing out of its complementary winding through the positive bank. Thus, for example, if current is flowing into winding $W_1$ through 1 SCR in the negative bank of Phase A, for example, (i.e., through SCR 1AN) current must be flowing out of winding $W_4$ through the number 4 SCR of the positive bank associated with one of the other phases. The current flowing into and out of a particular winding can be supplied from one phase of the supply voltage or from all of the phases of the supply voltage depending on the speed of the machine. As will be shown in greater detail later, if the machine speed is very low so that the rotational speed is low compared to the supply frequency, a new supply phase occurs each few degrees of the rotation of the machine rotor pole so that supply voltage will change a number of times during the interval that current flows in a single armature winding. As a result, current will be supplied to the windings from all of the phases through the individual rectifier banks. On the other hand, when the machine speed is high compared to the supply frequency, even though still operating as a motor, the time interval during which a single winding of the armature must be supplied with current is only a few degrees of the supply phase so that a single supply phase will then supply current not just to a single winding but to several, if not all windings of the armature during a single alternation of the supply voltage phase. Thus, the system is very flexible at all speeds in that the firing of the individual rectifiers in the positive and negative banks associated with each of the supply phases is controlled to supply current to the windings and operate the dynamoelectric machine as a brushless motor in the starter mode.

When the machine reaches a given speed at which the dynamic load driven by the machine as a motor reaches a predetermined speed, such as idling speed for a jet engine, for example, the firing and control circuits for the rectifiers in the cycloconverters which fire it as a function of the rotor position are disabled. The machine operates as generator and the cycloconverters function as frequency converters to convert the output voltage of the machine which varies in frequency as a function of speed. To this end, the phases and the rotor position signals and generating circuits are disabled and a reference wave generator is enabled. The reference wave generator signal is then compared to the integral of the line voltage from the generator to generate triggering pulses which fire the individual rectifiers with varying degrees of advance and retard to generate a constant frequency output from the varying input. When operated as a frequency converter for a variable speed constant frequency electrical generating system, the supply voltage, as described in FIG. 1 is disconnected and the output voltages from machine windings $W_1-W_6$ are coupled via terminals 92 to a network in which firing waves are the integral of the generator line-to-line voltages are derived from these output voltages. The firing waves are compared to the reference wave signals in a suitable modulator circuit to generate the triggering signals so that the positive and negative banks associated with each phase operate respectively as rectifying and inverting banks to produce a constant frequency output. The manner in which the firing wave is generated and the rectifiers are triggered to produce a constant frequency output is described in a number of patents assigned to the General Electric Company, assignee of the present invention. Reference is hereby made to Patents:

1. U.S. Pat. No. 3,400,321, David L. Lafuze, Protective Circuits for Frequency Converter System, Sept. 3, 1968
2. U.S. Pat. No. 3,431,483, David L. Lafuze, Cycloconverter Power Circuit, Mar. 4, 1969
3. U.S. Pat. No. 3,593,106, David L. Lafuze, Cycloconverter with Rectifier Bank Control for Smooth Switching Between Rectifier Banks, July 13, 1971 for showing of frequency conversion circuits and the triggering means for producing a constant frequency output from a variable frequency input signal from the generator.

THE SCR FIRING CIRCUITS

Figure 4:
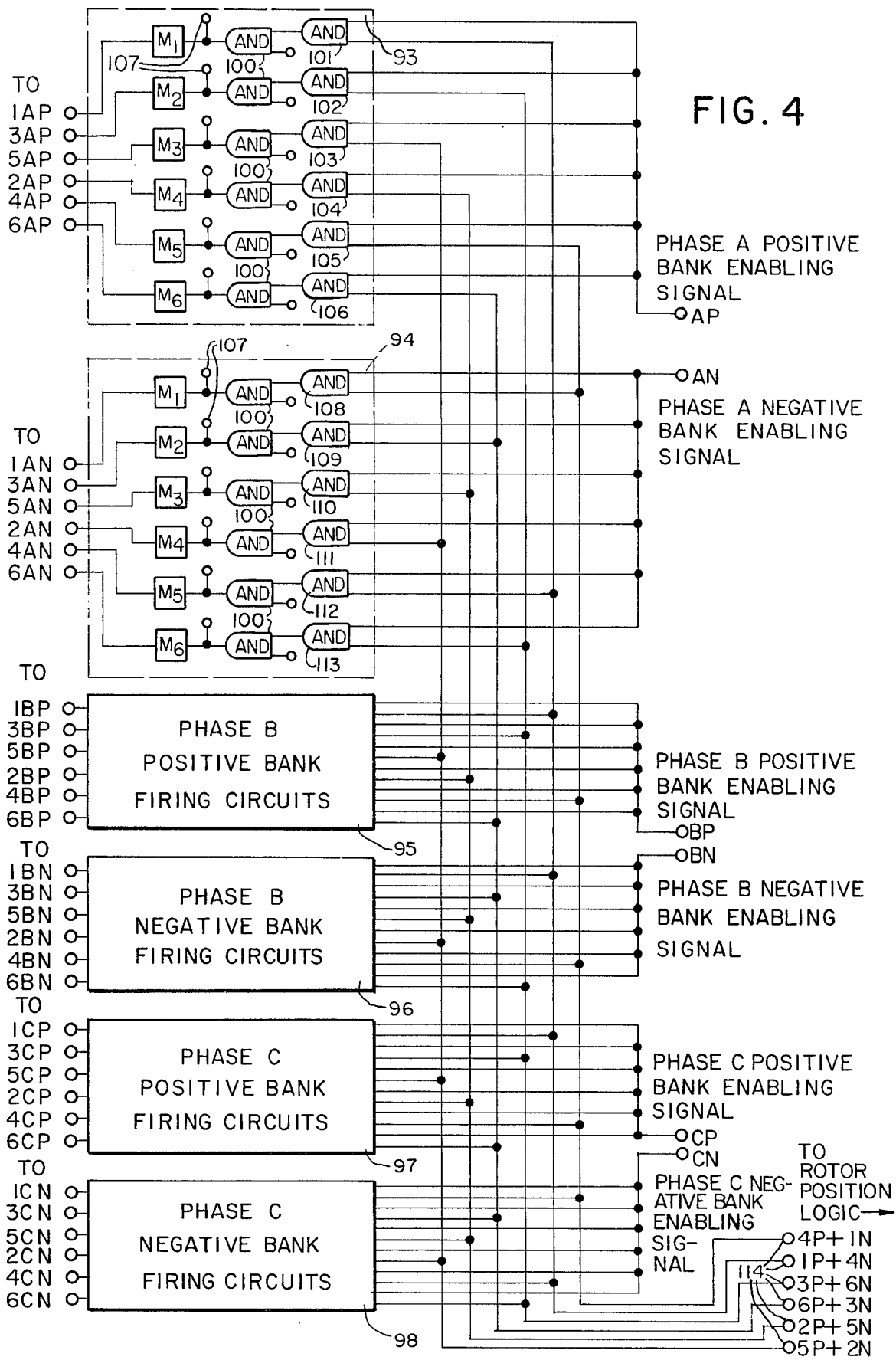
FIG. 4 is a circuit diagram showing the firing control circuits for each rectifier bank.

The firing circuits for the negative and positive SCR banks in each of the phases are illustrated in block diagram form in FIG. 4. Thus, FIG. 4 shows a Phase A positive bank firing circuit 93, a corresponding Phase A negative bank firing circuit 94 and similar positive and negative banks firing circuits 95, 96 and 97 and 98 for the B and C phases. Since all of the firing circuits are alike, only the firing circuits for the positive and negative banks of Phase A are illustrated in detail. Thus, the Phase A positive bank firing circuit 93 consists of a plurality of modulators M1–M6 which are connected respectively to the gate electrodes of the SCR's 1AP–6AP of the positive rectifier bank in Phase A. The modulators are of the type which produce a triggering signal at its output whenever the input to the modulator goes positive. Reference is specifically made to FIG. 3 of U.S. Pat. No. 3,400,321 identified previously for a detailed showing and description of one form of such a circuit. The inputs to the modulators is from the Rotor Position Logic Network 20 and Phase Control Blanking Network 40, presently to be described in detail, when in the starting mode and from the firing wave and reference wave generator when the system is in the generating mode. In the starting mode, the input to each modulator M1–M6 is from AND gates 100 and AND gates 101–106. All of the AND gates 101–106 have one input identified as "Phase A Positive Bank Enabling Signal" from Phase Control Network 40 so that these gates are enabled only when the supply Phase A is negative with respect to the preceding phase, i.e., Phase C. In other words, the SCR's in the positive bank of Phase A can be triggered to allow current to flow out of the machine windings only when Phase A is negative with respect to the preceding phase. Each of the AND gates 101–106 has another input from Rotor Position Logic Network 20 to enable each of the gates selectively whenever the particular winding associated with that SCR is to be supplied with current. Thus, each of the AND gates 101–106 is enabled only when one specific winding is to have current supplied or drawn from it. With the particular arrangement shown AND gate 101 receives an enabling signal from the rotor position logic network only if winding $W_1$ is to be energized, AND gate 102 when winding $W_3$ is to be energized, AND gate 103 when winding $W_5$ is to be energized, and AND gates 104, 105 and 106 when windings $W_2$, $W_4$ and $W_6$ are to be energized. Thus, when winding $W_1$ is to be controlled so as to permit the flow of current out of winding $W_1$ to Phase A, AND gate 101 will produce a positive output signal only if a positive enabling signal at one input indicates that the phase polarity is proper and the Rotor Position Logic Signal to the other input is positive indicating the flux adjacent $W_1$ is high. This positive output is applied as one input to and associated AND gate 100 which is connected to modulator M1. The other input to AND gate 100 is from a control signal which is energized only when the machine is in the starting mode. Thus, AND gate 100 is enabled only when the system is in the starting mode. When the system switches over to the generating mode the positive enabling signal for AND gate 100 is removed, the gate is disabled thereby removing the signals which are responsive to the supply voltage and the rotor position logic from the modulators. In their place a signal representative of the integral of the line-to-line generator voltage and the reference voltage is applied to the modulator through input terminals 107 to trigger the modulators and fire the respective SCR's in the proper phase sequence to convert the variable frequency generator voltage to a constant frequency output voltage.

However, in the starting mode, the individual AND gates are enabled by the phase bank enabling signal and the Rotor Position Logic Signal to produce an output signal which is then transmitted through AND gate 100 to the modulator to fire the individual SCR's in the positive bank whenever the phase voltage is proper and the position of the rotor indicates that a current is to flow out of a particular winding. Similarly, the Phase A negative bank firing circuit 94 includes a set of modulators M1–M6 for the 1AN–6AN SCR's in negative firing bank. The modulators are controlled either from an input signal at terminals 107 representative of the integral of the generator line-to-line voltage and the reference voltage when the system is in the generating mode or in response to the output from AND gates 108 through 113 and which coupled to the modulators through AND gate 100. AND gates 108 through 113 are enabled by a Phase A negative bank enabling signal applied to one input whenever the Phase A supply voltage is positive with respect to its preceding phase so that the rectifiers in the negative bank may be fired in the proper sequence to permit the flow of current from the supply source in Phase A into the armature windings. The other input signals to the individual AND gates 18 from the Rotor Position Logic Network 20 which determines which armature winding is to receive current and hence, which gate and which modulator is to produce an output triggering pulse to drive the proper SCR into conduction.

All of the remaining firing circuits for the negative and positive banks in both the Phase B and Phase C circuits are of identical construction and are selectively actuated both in the starting (or motoring) mode by phase enabling signals and signals from the Rotor Position Logic Network to fire the proper sequence of SCR's in the various banks to permit current flow into and out of selected pairs of armature windings. that is, as pointed out previously, whenever winding $W_1$ is to have current flowing into it from the source the winding $W_4$ which is 180° out of phase with it must have current flowing out of the winding and into the source. Similarly, when $W_3$ has current flowing into it, $W_6$ has current flowing out of it and when $W_5$ has current flowing into it, $W_2$ has current flowing out if it and vice versa. Since the systems operate in pairs and there are three phases, each control signal from the Rotor Position Logic Network will enable 6 AND gates simultaneously. However, only two of the six AND gates will be enabled by the Phase Control Enabling Signal to insure that the proper pair of negative and positive SCR's are fired.

| Winding No. | Direction of Current Flow |
|---|---|
| $W_1$ | P |
| $W_4$ | N |
| $W_1$ | N |
| $W_4$ | P |
| $W_3$ | P |
| $W_6$ | N |
| $W_3$ | N |
| $W_6$ | P |
| $W_5$ | P |
| $W_2$ | N |
| $W_5$ | N |
| $W_2$ | P |

Consequently, all of the AND gates associated with the number 1 SCR's in the negative bank have a common input from the logic control. Since the number 4 SCR's in the positive banks must be fired at the same time as the number 1 sCR's in the negative bank, all the AND gates for the number 4 SCR's in the positive (P) banks and the AND gates for the number 1 SCR's in the negative (N) banks receive a common enabling signal from the Rotor Position Logic Network. Which SCR's in the respective phase banks are actually triggered is then controlled by the phase control voltage and depend on the polarity of the supply voltage phases. Similarly, all of the AND gates for number 1 SCR's in the positive banks are tied together with all of the AND gates related to the number 4 SCR's in the negative banks.

The AND gates related to the number 3 SCR's in the positive banks are tied to the AND gates of the number 6 SCR's in the negative banks and the AND gates of the number 3 SCR's in the negative banks are tied to the AND gates for the number 6 SCR's in the positive banks. Similarly, the AND gates for the number 5 SCR's in the positive banks are tied to the AND gates for the number 2 SCR's in the negative banks and the AND gates for the number 5 SCR's in the negative banks are tied to the AND gates for number 2 SCR's in the positive banks.

Hence, a plurality of input terminals 114 are provided to receive signals from the Rotor Position Logic Network. As shown, the top terminal receives a signal to enable all of the AND gates associated with the number 1 SCR's in the negative banks of all phases and the number 4 SCR's in the positive banks of all phases. The second terminal receives an enabling signal for the AND gates associated with all the number 1 SCR's in the positive banks and all the number 4 SCR's in the negative banks. The third terminal is connected to the AND gate associated with all of the number 3 SCR's in the positive banks and the number 6 SCR's in the negative banks. The fourth terminal is an enabling signal for the AND gates associated with all the number 6 SCR's in the positive banks and the number SCR's in the negative banks. The fifth terminal receives the enabling signal for all number 2 SCR's in all the positive banks and the number 5 SCR's in the negative banks. The sixth and last terminal receives an enabling signal for the AND gates associated with all of the number 5 SCR's in the positive banks and the number 2 SCR's in the negative banks.

PHASE CONTROL BLANKING NETWORK

The Phase Control Network provides a means to generate a blanking or enabling signal which permits transfer of current from one supply phase to the next phase only of the polarity of the supply phase is proper. Thus, if current flow is to be negative, i.e., into the winding, current transfer between supply phases is allowed only when the phase becomes positive with respect to the conducting phase. Where current flow is to be positive, i.e., out of the winding, current transfer between supply phases is permitted only when a phase has become negative with respect to the preceding conducting phase. That is, when Phase A becomes positive with respect to Phase C, assuming a phase sequence A, B, C, a blanking or enabling signal is generated for the negative rectifier bank in the A phase cycloconverter during the interval that Phase A is positive with respect to Phase C. During the same interval as Phase C has become negative with respect to Phase B an enabling signal is generated for the positive rectifier banks of the Phase C cycloconverter to trigger selected rectifiers in the positive bank and permit current flow out of the armature windings. Similarly, the network must generate a blanking signal when Phases B and C become positive relative to the other phases to enable the negative rectifier banks in those phases while simultaneously enabling the positive rectifier banks to provide the proper current flow. In addition, the integral of the line-to-line supply voltage is generated to function as a firing or triggering signal to vary the duration of the Phase A, Phase B and Phase C blanking signals level to control the level of the current in the armature windings. The generation of the phase blanking signals to indicate that the current may be transferred from one conducting phase to the next phase, could be done directly from the phase voltages. However, since integrals of the line-to-line voltages must be generated in any event to vary the firing angle of the SCR's to control the current level in the machine, the integral of the line-to-line voltage may also be used to generate the blanking voltages. That is the integral of the Phase C to Phase B line voltage has the same phase as supply Phase A, the integral of Phase C to Phase A line voltage has the same phase as supply Phase B and the integral of supply Phase B to Phase A line-to-line voltage has the same phase as Phase C. Therefore, by subtracting the integral of B-A from the integral of C-B, it is possible to generate a blanking signal which is positive for the same interval that Phase A is positive with respect to C. Similarly, by subtracting the integral of C-B from the integral of A-C and the integral of A-C from the integral of B-A, blanking signals are generated which are positive for the same interval that B is more positive than A and C is more positive than B. When each particular phase voltage goes more positive than the preceding phase, current conduction into the machine can be transferred from the preceding phase. Similarly, when these voltages go negative relative to the preceding phase, phase current conduction out of the armature windings can be transferred from the preceding phase to the phase that has gone negative. The blanking voltages are therefore utilized to enable firing of the SCR's in the particular phase bank either positive or negative.

The manner in which the integral of the line-to-line supply voltages may be subtracted from each other to generate the blanking voltages for the A, B and C phases may perhaps be more easily understood by first considering the wave forms of the supply voltage, etc. shown in FIGS. 5a through 5c. Thus, in FIG. 5a, the three-phase supply voltage is shown as having an A, B, C phase sequence with the voltage plotted along the ordinate and time along the abscissa. Thus, the three phase supply voltage A, B, and C are illustrated in FIG. 5a. FIG. 5b shows the integral of the line-to-line supply voltages which may be obtained by integrating the individual supply voltage phases and subtracting them. Thus, in FIG. 5b the integral of the Phase A to Phase C line-to-line voltage ( $\int$ A-C) is shown by the curve denominated $\int$ A-C and similarly, the integrals of the other line-to-line voltages are identified by the legends $\int$ B-A and $\int$ C-B. It will be noted from FIGS. 5a and 5b that at $t_0$ the phase voltage A becomes more positive than the preceding phase voltage C and continues to a remain more positive until the time $t_2$ when C once more becomes more positive than A. It will also be noted from FIG. 5b that at time $t_0$ the $\int$ C-B goes positive with respect to the integral of the supply line-to-line voltage B to A $\int$ B-A and stays more positive until time $t_2$. Thus, by sensing when the integral of the Phase C to Phase B line-to-line voltage becomes more positive than Phase B to Phase A line-to-line voltage it becomes possible to generate a blanking or enabling voltage at that point of time and terminating the blanking voltage at $t_2$ when $\int$ B-A once more becomes more positive than $\int$ C-B. FIG. 5c shows such a blanking voltage which goes positive at $t_0$ and goes negative at $t_2$ when the $\int$ C-B becomes more negative than $\int$ B-A. The integrals of these two line-to-line voltages provide a measure of the interval during which Phase A is more positive than Phase B. Similarly, it can be seen that a Phase B blanking voltage may be generated by subtracting the integral of C-B from the integral of A-C since at $t_1$ $\int$ A-C becomes more positive than $\int$ C-B and remains more positive until $t_4$. It will also be noted from $t_1$ to $t_4$ Phase B is more positive than Phase A and hence, a Phase B blanking voltage shown in FIG. 5d is generated at $t_1$ and continues until $t_4$. The Phase C blanking voltage is generated by subtracting the integral of the A-C voltage from the integral of the B-A voltage. The $\int$ B-A voltage becomes more positive than the $\int$ A-C voltage at $t_3$ and continues to be more positive until $t_5$ which, as may be seen from FIG. 5a corresponds to the time that Phase C is more positive than Phase B. Thus, as shown in FIG. 5e a C Phase blanking voltage is generated at $t_3$ and continues until $t_5$. Three blanking voltages A, B and C are thus generated and represent a time period during which one of the supply phases has become more positive than the preceding phase and may be utilized to enable the negative rectifier banks to permit current flow into the armature windings. By inverting and processing these blanking voltages, it will be obvious that positive blanking voltages can be generated which represent the time intervals at which any given phase becomes more negative than the preceding phase and hence, may be used to control the positive rectifier banks in the cycloconverter to allow current to flow out of the armature windings.

Figure 6:
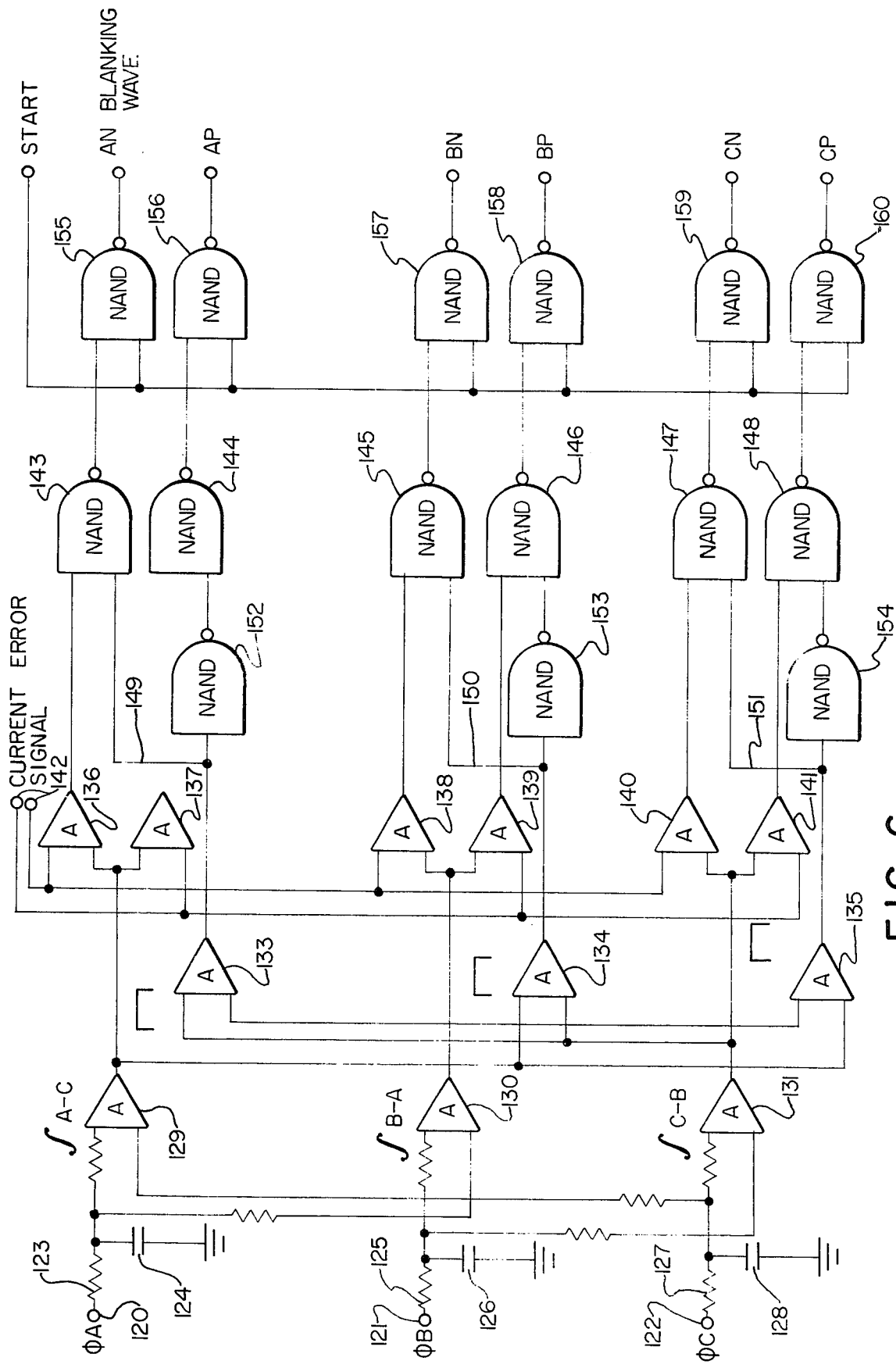
FIG. 6 shows the supply voltage phase control logic circuitry.

FIG. 6 illustrates the Phase and Blanking Control Circuit for generating the blanking voltages as a function of the supply voltage polarities and machine current level to generate enabling voltages at the proper time and of the proper duration for the firing circuits for the positive and negative banks of the cycloconverters.

The three phase supply voltages A, B, and C are applied to input terminals 120, 121 and 122 respectively of the phase control and blanking network illustrated in FIG. 6. The three phase supply voltages are coupled to three R-C integrating networks consisting of resistors 123, 125 and 127 and capacitors 124, 126 respectively. The RC integrating networks produce a voltage which is proportional to the integral of the phase voltages A, B and C and these integrated voltages are applied to a plurality of operational amplifiers shown generally at 129, 130 and 131. The integrated supply voltages are combined and subtracted in the operational amplifier to produce voltages at the outputs of amplifiers 129–131 which are respectively proportional to the integral of the line-to-line voltages. Thus, the integrated phase A voltage is applied to the non-inverting terminal of operational amplifier 129 whereas the integrated phase C supply voltage is applied to the inverting terminal of operational amplifier 129. The output of amplifier 129 is therefore the integral of Phase A minus the integral of the Phase C voltage and therefore, represents the integral of the line-to-line voltage between Phases A and C. ( $\int$ A-C). The input to operational amplifier 130 is the integrated Phase B voltage applied to the non-inverting terminal and the integrated Phase A voltage applied to the inverting terminal. The output is therefore the difference of these voltages and is equal to the integral of the Phase B to Phase A line-to-line voltage ( $\int$ B-A). The input to operational amplifier 131 is the integral of the Phase C line voltage which is applied to its non-inverting terminal and the integral of the Phase B voltage which is applied to its inverting terminal thereby producing an output voltage which is proportional to the integral of the line-to-line voltages between Phases C and B of the supply voltage.

Figure 5:
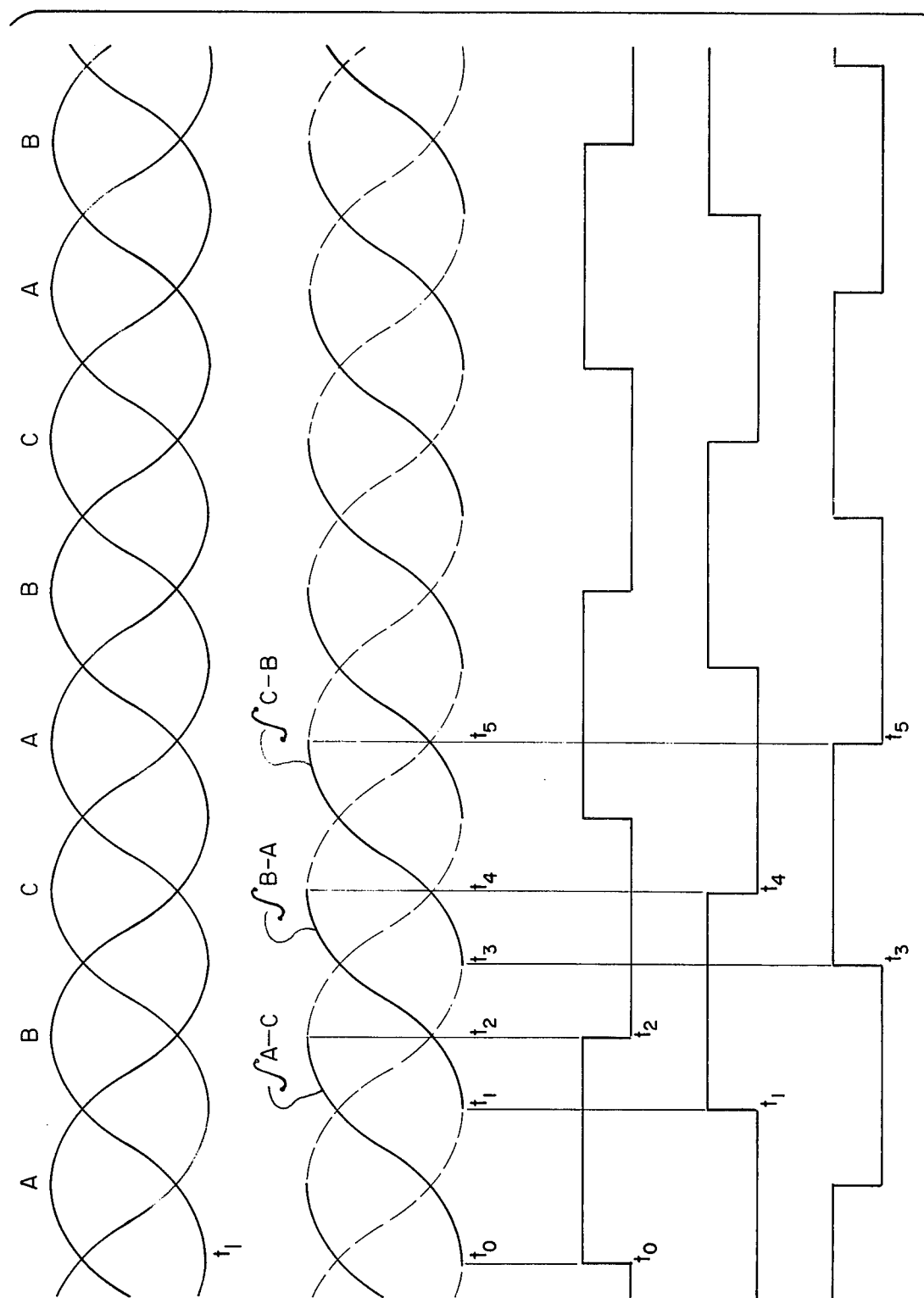
FIG. 5a–5c shows the supply voltages and the line-to-line voltages derived therefrom which are utilized to generate the supply phase controlled blanking waves for the rectifier banks.

As pointed out previously, the integrals of the line-to-line voltages are utilized not only to generate the Phase A, B, and C blanking waves, but also to control the magnitude of the current supplied to the armature windings by comparing the firing waves and an error signal obtained from machine armature current control network 47 (FIG. 1), and modifying the duration of the blanking waves of the current flow. To this end, the integral of the line-to-line voltages are applied to a second set of operational amplifiers 133–135 which constitutes the means for generating the phase blanking signals. Operational amplifier 133 subtracts the $\int$ B-A from $\int$ C-B to produce an output signal which is a Phase A blanking voltage. As pointed out in connection with the discussions of the wave forms of FIG. 5 the integral of the line-to-line voltage between Phase C and Phase B has the same phase as Phase A of the supply voltage, and the integral of the line-to-line voltage between Phase B and the Phase A has the same phase as Phase C of the supply voltage. By substracting the two integrals, a blanking wave is generated at the time that the $\int$ C-B phase voltage becomes more positive than the B-A voltage. Thus, the integral of the Phase C to Phase B line-to-line voltage is applied to the non-inverting input of operational amplifier 133 and the integral of the Phase B to Phase A line-to-line voltage is applied to the inverting input of the amplifier. Thus, at time $t_0$ as shown in FIG. 5b when the $\int$ C-B ecomes more positive than the $\int$ B-A the output of the operational amplifier goes positive and remains positive until $t_2$ when $\int$ B-A becomes more positive than $\int$ C-B. Thus, the output of operational amplifier 133 is a blanking voltage which is positive for the same interval that Phase A of the supply voltage is more positive than Phase C.

Similarly, operational amplifier 134 $\int$ A-C applied to its non-inverting terminal and the $\int$ B-C applied to its inverting terminal. As a result, the output of operational amplifier 134 is blanking voltage which is positive for the same interval that Phase B is more positive than Phase A. Operational amplifier 135 subtracts $\int$ B-A from $\int$ A-C to produce a blanking voltage which is positive for the same time interval than Phase C is more positive than Phase B.

The blanking voltages at the outputs of operational amplifiers 133–135 represent the maximum time interval available for conduction for a given phase, since it assumes that the SCR's in the networks are fired a soon as one phase becomes more positive than the proceding phase and current conduction is transferred to that phase immediately. In order to control armature current to maintain it at a predetermined level, it is desirable to modify the duration of the blanking wave as a function of the departure of current level in the machine from the predetermined level. By changing the duration of the phase blanking wave, the conduction angle and hence, the current flowing into and out of the machine is varied. To this end, the integrated firing voltages which have been utilzed to generate the blanking voltages are applied to the comparator network in which the firing waves, that is, the integrated line-to-line supply voltages are compared with an error signal representing the actual armature current or the current from the supply source to the converters. That is the output from a phase controlled rectifier decreases linearly with the integral of the voltage between the previously conducting phase and the phase being controlled. use of the firing waves derived by integrating the line-to-line voltage results in a linear control characteristic, i.e., when the error or demand signal changes by 2 to 1, for example, the output will also change by 2 to 1. As pointed out in connection with the system of FIG. 1, means are provided to sense the departure of the machine or supply current from the desired level and to generate an error signal representing both the magnitude and the direction of this departure. By comparing this error signal with the firing voltages, a control signal is generated which modifies the duration of the blanking voltages so that the time that SCR's in any given phase can conduct to drive current through the SCR's into or out of the windings is controlled as a function of this error signal. The current level modifying control signals are derived by applying the firing voltages from operational amplifiers 120–131 as one input to a plurality of operational amplifiers 136–141. Operational amplifiers 136 and 137 are in the A phase blanking signal generating path, amplifiers 138 and 139 are in the B phase blanking signal generating path and amplifiers 140 and 141 are in C phase blanking signal generating path. The integral of the line-to-line voltage is applied to the inverting terminal of one amplifier of each pair and to the non-inverting terminal of the other amplifier. The error signal from the machine armature current control network 47 of FIGS. 1 and 2 at input terminals 142 is applied to the remaining inputs of each of the operational amplifiers. The error signals are thus compared to the firing waves to produce a rectangular wave output signal from the operational amplifiers, the duration of which is a function of he error signal.

The current level control signals from the operational amplifier pairs are applied as one input to NAND gate pairs 143–144, 145—146 and 147–148, in the respective A, B and C phase blanking paths. The otherr inputs to the NAND gates are the blanking signals from operational amplifiers 133–135 in the case of NAND gates 143, 145 and 147 and the inverse of the blanking signals. The blanking signals from operational amplifiers 133–135 are applied over leads 149, 150 and 151 to the one input terminal of NAND gates 143, 145 and 147. The blanking signals from operational amplifiers 133–135 are also applied as one input to NAND gates 152–154 respectively where the blanking signals are inverted. That is, NAND gates are characterized by the fact that the output of the gate is negative only if both inputs to the gate are positive. For all other combinations of inputs, the output of the NAND gate is positive. Thus, NAND gates 152–154 go negative whenever the output of operational amplifiers 133–135 is positive, i.e., during the blanking interval when Phases A, B, and C are more positive than the preceding phase. NAND gates 152–154 are positive, on the other hand, when amplifiers 152–154 go negative, i.e., phases a, B and c are more negative than the preceding phase. As a result, the output from NAND gates 152–154 which are applied as one input to NAND gates 144, 146 and 148 respectively control these gates so the output of NAND gates 144, 146 and 148 is always opposite that to their companion NAND gates 143, 145 and 147. The outputs of NAND gates 143–148 are applied as one input to NAND gates 155–160 with the other input to these NAND gates being from an enabling signal terminal 161 which is connected over the lead 162 to the other input terminals of the NAND gates.

It will be obvious from the description that NAND gate 143 in the phase A path is controlled by the current control voltage from operational amplifier 133. Thus, the output of NAND gate 143 goes negative for the entire duration of the interval where the blanking wave is positive and the output from the operational amplifier 136 is positive. Since the duration of the blanking wave from operational amplifier 133 is fixed, the output from NAND gate varies as a function of the duration of the output signal from operational amplifier 136 which is controlled in response to the current error signal. The output from NAND gate 143 is inverted in NAND gate 155 to produce a positive output enabling pulse for the Phase A negative rectifier banks for the duration of the interval when the Phase A blanking wave is positive and the current level control signal from operational amplifier 136 is also positive. The output from the complementary NAND gate 144 in the Phase A path is the inverse of the output of NAND gate 143 since the blanking wave from operational amplifier 133 is inverted in NAND gate 152 before being applied to NAND gate 144. When NAND gate 155 goes positive to supply a positive enabling signal to the Phase A negative banks, during the interval when Phase A of the supply voltage is more psoitive than Phase C, NAND gate 156 output is negative thereby disabling the Phase A positive firing bank. As soon as the enabling signal for the Phase A negative bank terminates, i.e., when the blanking signal from operational amplifier 133 again goes negative, the output of NAND gate 152 goes positive so that both inputs to NAND gate 144 goes negative, the output of NAND gate 156 goes positive and an enabling signal is applied to the Phase A positive firing circuit and the positive rectifier banks are enabled. it can be seen therefore, that the Phase A path produces an enabling signal for the Phase A negative bank rectifiers whenever Phase A is more positive than Phase C and produces a positive enabling signal to the positive firing bank when Phase A goes more negative then Phase C.

In a similar manner, the output from NAND gate 157 and 158 in the Phase B path produce positive enabling signals for the Phase B negative and positive rectifier banks when Phase B is more positive than Phase A for the negative rectifier bank and when Phase B goes more negative than Phase C for the positive rectifier bank. NAND gate 159 and 160 in the C phase path produce enabling signals for the C phase negative rectifier bank when the C phase is more positive than the b phase and for the C phase positive rectifier bank when the Phase C becomes more negative than the Phase B.

Figure 7:
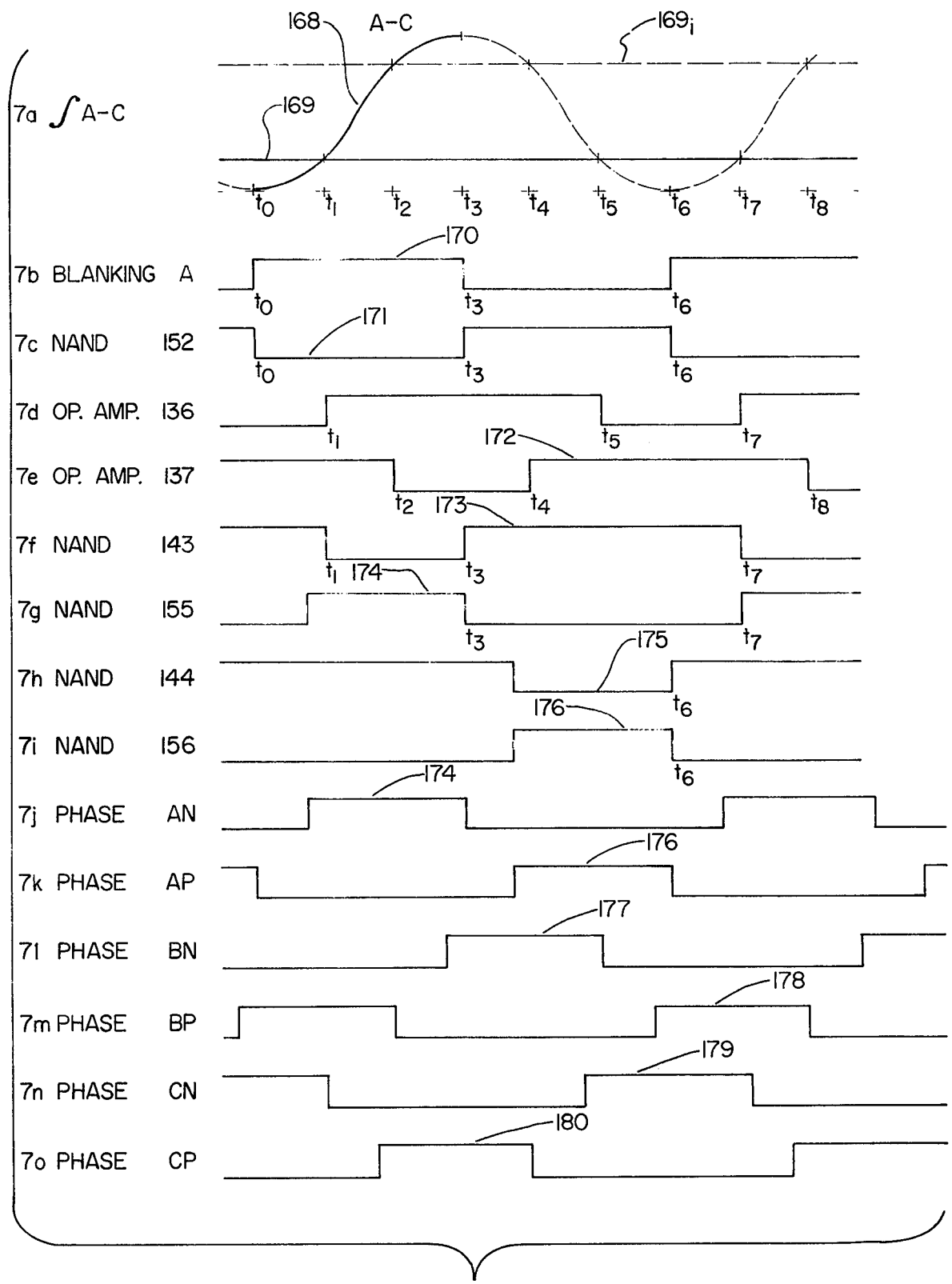
FIG. 7 shows the wave forms existing in one portion of the phase control logic circuitry of FIG. 6 and are useful in understanding the manner in which the enabling signals for the various rectifier banks are generated.

The manner in which the blanking signals for the rectifier banks are generated may be more easily understood in connection with the wave forms of FIG. 7 which represent the wave forms for the various circuits making up the Phase A control network of FIG. 6. Thus, FIG. 7a shows the firing wave from operational amplifier 129 which represents the integral of the Phase A to Phase C line voltage (i.e., $\int$ A-C). Since $\int$ A-C lags Phase A of the supply voltage by 90°, i.e., as will be recalled from the wave forms of FIG. 5 from $t_0$ ti $t_3$, which represents one-half of the firing wave, Phase A is positive with respect to Phase C and a positive blanking signal 170 is generated at the output of operational amplifier 133. This, of course, means that the negative rectifier banks in Phase A may be fired at any time during this interval to permit current to flow from the Phase A supply into the armature windings. The blanking voltage 170 is applied as one input to NAND gate 143 and also to NAND gate 152. The output of NAND gate 152 is the inverse of the blanking wave and the output of NAND gate 152 as shown in FIG. 7c, is a wave 171 which is negative during the interval that blanking wave 170 is positive and vice versa. The intergral of the line-to-line voltage 168 is also applied to the operational amplifiers 136 and 137 where it is compared with the current level error signal represented by the D.C. voltage wave 169 in FIG. 7a. Since the firing voltage 168 is applied to the non-inverting terminal of operational amplifier 136 and the error signal representing current level in the machine or from the supply source is applied to the inverting terminal, the output of operational amplifier 136 will remain negative until the firing voltage becomes more positive than the current error signal. Consequently, the output of operational amplifier 136 which is shown in FIG. 7d as wave 171a remains negative until $t_1$ when the firing voltage becomes more positive than the current level error signal. At $t_1$ the output of the operational amplifier goes positive and remains positive until $t_5$ when the firing wave 168 once more becomes less positive than error signal 169. The firing wave 168 is also applied to the inverting terminal of operational amplifier 137 and the current level error signal 169 is applied to the non-inverting input terminal. The output of operational amplifier 137 is therefore positive until $t_2$ when input firing wave 168 becomes more positive than error signal 169. At $t_2$ the output of the operational amplifier goes negative and remains negative until $t_4$ when the firing wave becomes less positive than the error voltage so that the amplifier output goes positive. The output of the operational amplifier remains positive until $t_8$ when the firing wave again becomes more positive than the reference wave thereby driving the output of the operational amplifier negative since the firing wave is applied to the inverting terminal. It can be seen therefore, that the output of operational amplifier 136 goes positive at $t_1$ and remains positive until $t_5$ and is negative for the interval from $t_5$ until $t_7$. The output of operational amplifier 137, on the other hand, is a rectangular wave form which is displaced in phase.

Although the output of operational amplifier 136 is positive from $t_1$ to $t_5$, the output of NAND gate 143 shown in FIG. 7f as wave 173 is negative only until $t_e$ since at this time, the Phase A blanking voltage 170 goes negative. The output of NAND gate 155 as shown by wave 174 of FIG. ug and which is the enabling voltage for the negative phase rectifier bank is positive only from $t_1$ to $t_3$. Similarly, though the output of operational amplifier 137 is positive from $t_4$ to $t_8$ the inverted blanking wave 171 which appears at the output of NAND gate 152 is positive only from $t_3$ to $t_6$. As a result, the output of NAND gate 144 shown at 175 in FIG. 7h is negative from $t_4$ until $t_6$ shown in FIG. 7h. The output of NAND gate 156 is positive from $t_4$ to $t_6$ indicating that the positive bank of the A phase is enable during this interval to allow current to flow from the armature windings to the supply source. It will be noted that the duration of the enabling signal for the positive and negative bank of the converter are controlled both by the blankin signal which represents the interval that a given phase is either positive or negative with respect to the preceding conducting phase and by current level in the machien with the duration of the blanking signal being varied as a function of the current level. Further, as the current level error signal increases or decreases, the point of intersection between the error signal and the firing wave varies. This varies the width of the positive going output pulses from amplifiers 136 and 137 and hence, the duration of the phase enabling output signals from NAND gates 155 and 156. It will be appreciated that the remaining phase channels B and C function in a similar manner to generate enabling signals for their respective negative and positive firing banks.

FIGS. 7j through 7o show the wave forms of the enabling signals and negative and positive banks of all three phases. It can be seen from these wave forms that enabling voltages for the negative rectifier banks allow current transfer from phase to phase. It is also apparent from these wave forms that the flow of current into and out of a pair of armature windings can never take place from a negative and positive rectifier bank in the same phase. If a negative rectifier bank in one phase is supplying current into a winding the current flow out of the complementary winding must be from the other two phases. Thus, if current is flowing into the machine from phase A because the A phase negative enabling voltage 174 is positive, the current flowing out is initially to Phase b since Phase B positive enabling voltage 178 is initially positive and then is transferred to Phase C when Phase B enabling voltage 178 goes negative and Phase C positive enabling voltage is positive. Similarly, when Phase b is supplying current flow into (i.e., negative current) the windings, current flow out of the windings is into the windings current flow out of the windings is initially into Phase A and then into Phase B.

ROTOR POSITION LOGIC

Figure 8:
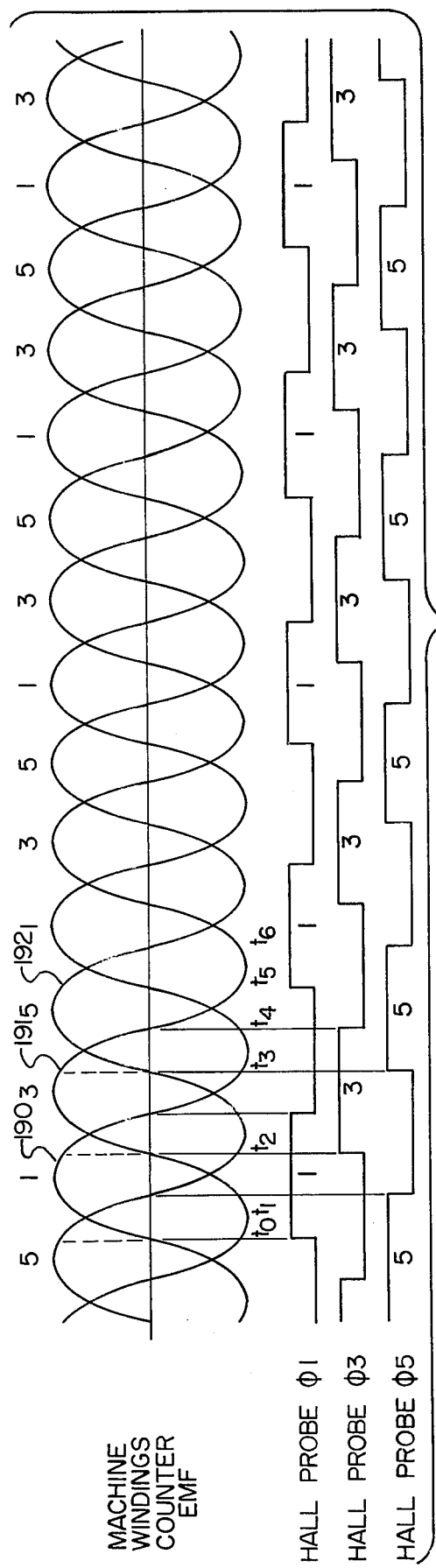
FIG. 8 shows the generated voltage in the machine when functioning as a motor and its phase relationship to the position sensor and the position sensor output.
Figure 9:
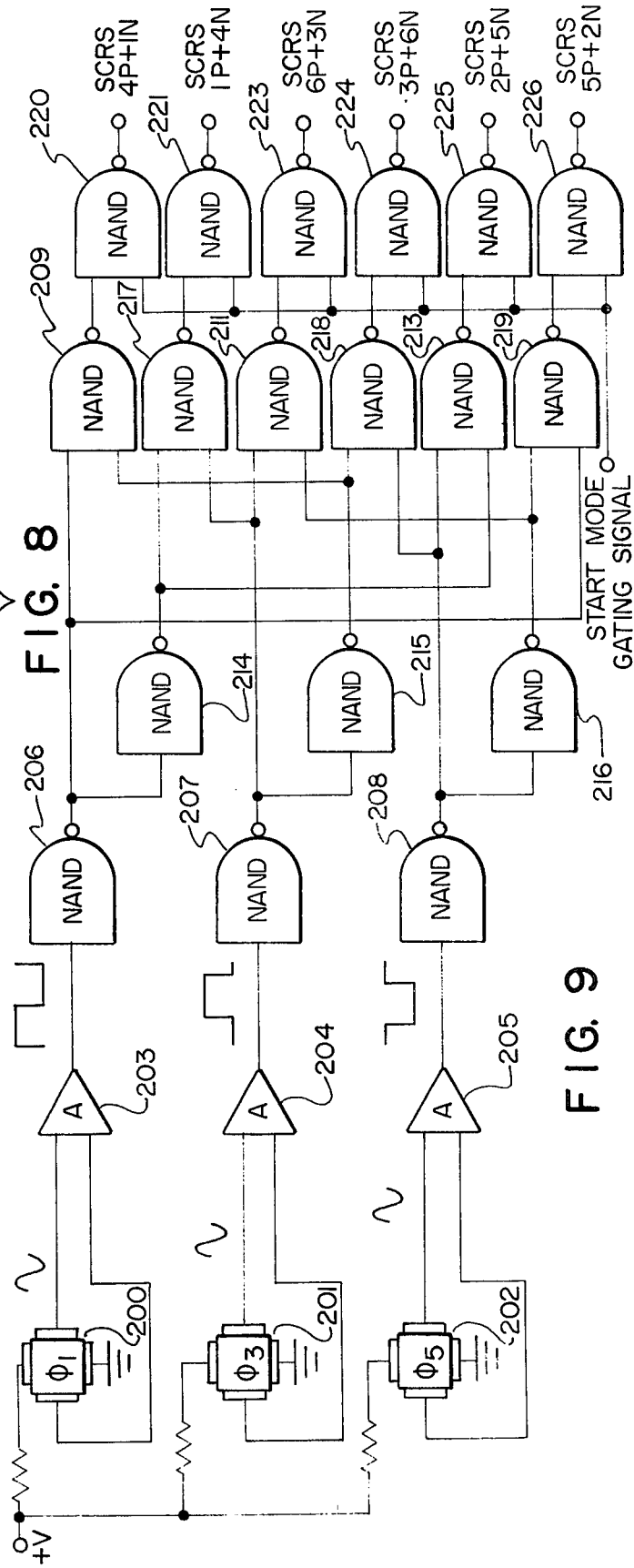
FIG. 9 is a schematic of the circuitry associated with the position sensors to generate the logic which controls the firing of the phase controlled rectifiers in the cycloconverter rectifier banks.

The Rotor Position Logic Network is shown in FIG. 9 and processes the output signals from the Hall generators to provide the output signals which determine the winding in which current flows. By positioning the hall probes at 120 electrical degrees apart it is possible to determine when the flux associated with a given winding reaches a maximum value. From this information, it is possible to generate signals which then allow current to flow into and out of the particular winding associated with the high flux of the field pole pair to produce positive torque. In addition, the Rotor Position Logic must ensure that the SCR associated with a given winding is triggered to allow current to flow only when the SCR associated with the armature winding phase which is next to be supplied with current is not in condition to be triggered to prevent simultaneous current flow in successive armature winding phases. For example, assume the firing sequence is to be that current flow successively into $W_1$, $W_3$ and than $W_5$, and out of windings 2, 4 and 6. When the hall probe indicates that current is to be supplied to winding $W_3$, the logic must generate the enabling signal for the SCR's associated with winding $W_3$ only during the interval when the Hall probes also indicate the flux at $W_3$ is high and the flux associated with winding $W_5$ is low. This is to insure that only one winding is turned on at a time. Thus, with the phase sequence 1, 3 and 5, it is obvious that when Phase 1 is conducting. The current flow can be switched to the Phase 3 winding only during the interval when the flux associated with the Phase 3 winding is high but not if the flux associated with Phase 5 is also high. Similarly, when current conduction is to be transferred from the Phase 3 winding of he machine to the Phase 5 winding of the machine, this can take place only when the flux at Phase 5 winding $W_5$ is high but not while the flux at Phase 1 winding $W_1$ is also high. In this fashion, the SCR's associated with the individual windings are triggered when the SCR's associated with the next phase winding to conduct current are positively disabled. The nature and significance of this relationship can best be understood in connection with the wave form diagrams of FIG. 8 which illustrates the wave form of the counter EMF generated in phase windings $W_1$, $W_3$ and $W_5$ and the output voltages from the Hall probes. Thus, in FIG. 8a, the counter EMF in the machine windings while driven as a motor is shown by the wave forms 190, 191 and 192. The output of the Hall probe amplifier associated with phase winding $W_1$, (also with phase 4 which is 180° out of phase with phase 1) is illustrated in FIG. 8b by the wave form 193 whereas the outputs of the Hall probes associated with phase windings $W_2$ and $W_5$ are shown as wave forms 194 and 195 in FIGS. 8c and 8d. The outputs of the Hall probes which are shown as rectangular waves having been processed in an operational amplifier or the like are displaced by 120 electrical degrees and the position of the Hall generator wave form with respect to the counter EMF is such that the output of the Hall probe is advanced sufficiently relative to the counter EMF to permit the conducting SCR to the commutated into the non conducting state when current is transferred to the next winding. Thus, at $t_0$ assume that current is being conducted into winding $W_5$ and is to be transferred next to phase winding $W_1$. Theoretically, in order to obtain the maximum torque out of the motor, it whoud be desirable to allow current conduction in the $W_5$ winding until $t_1$ and then switch current conduction from the W0hd 5 winding to the $W_1$ winding. That is, it would be desirable to allow the number 5 SCR's to conduct current into winding $W_5$ as long as possible and turn them off at $t_1$. However, due to the fact that it may be difficult to commutate the SCR which is conducting into the non-conducting state if this is done, it is desirable to advance the firing of the next SCR to allow sufficient volt seconds to turn off the previously conducting SCR. Consequently, the Hall probes are so positioned that the Hall voltage goes to a maximum at some time $t_0$ before $t_1$. thus the hall probe is so positioned that, at $t_0$, the Hall probe voltage of phase 1 goes positive generating a firing voltage for the Number 1 SCR's. When one of the Number 1 SCR's is turned on, the conducting Number 5 SCR is then commutated off. That is, if a Number 1 SCR is triggered into conduction at $t_0$ when the counter EMF of winding $W_5$ is still more positive than the counter EMF of winding $W_1$ current flows from winding 5 into winding 1. This internal current loop between SCR's will tend to turn the Number 5 SCR off before $t_1$ since the counter EMF volt seconds from $t_0$ to $t_1$ of wave form 191 is available to commutate the Number 5 SCR off.

It can also be seen from the Hall probe voltages 193-195 that the enabling voltage for Number 1 SCR's in the various banks which are to be derived from the Hall probe voltages cannot be coextensive with Hall probe voltage 193 since this would result in miscommutation and inability to transfer current from $W_1$ to the next phase winding $W_3$. That is, after time $t_2$, the phase 3 hall probe voltage goes positive and the enabling signal for the Number 3 SCR's in the various banks is generated. It is therefore necessary to terminate the enabling voltage for the Number 1 SCR's at the time that the Nuber 3 SCR's are enabled to otherwise it might not be possible to turn on the Number 1 SCR's off and turn the Number 3 SCR's on. The SCR's associated with a given phase winding are enabled to allow current transfer to that winding fromthe previous winding in the sequence only if the SCR's associated with the phase winding to which current is to be transferred next are disabled. The following Truth Table indicates the relationships and establixhes the intervals during which enabling voltages for the SCR's may be generated to produce the proper switching of current between the windings.

| Hall Probe Condition | Negative Bank SCR's which may be fired | Positive Bank SCR's which may be fired |
|---|---|---|
| 1 (high) . 3 (low) | 1N | 4P |
| 1 (low) . 3 (high) | 4N | 1P |

-continued

| Hall Probe Condition | Negative Bank SCR's which may be fired | Positive Bank SCR's which may be fired |
| --- | --- | --- |
| $\overline{3}$ (high . $\overline{5}$ (low) | 3N | 6B |
| $\overline{3}$ (low) . $\overline{5}$ (high) | 6N | 3P |
| $\overline{5}$ (high) . $\overline{1}$ (low) | 5N | 2P |
| $\overline{5}$ (low) . $\overline{1}$ (high) | 2N | 5P |

FIG. 9 illustrates one form of the 2N Rotor Position Logic Network which generates the enabling voltages for the various SCR combinations to permit current flow into and out of the armature windings in the proper sequence when the flux is maximum both in the positive and negative directions relative to those windings. The $Q_1$, $Q_2$ and $Q_3$ Hall probes are illustrated schematically at 200, 201 and 202. The hall probes are positioned at 120 electrical degrees apart and comprises a slab of Hall material which has an energizing voltage from a source of positive potential +V across one pair of faces. A Hall voltage is generated across anothr pair of faces in response to the flux applied to the Hall device. The Hall voltages which are generally trapezoidal in shape are applied to a plurality of operational amplifiers 203–205. The operational amplifiers have a very high gain so that they saturate at very low voltage levels. As a result, a virtually square wave form is generated at its output from the Hall voltages. The square wave output voltages from the operational amplifiers are 180° out of phase with the Hall voltages and are applied to a series of NAND gates 206–209 to invert the square waves and produce a square wave which is in phase with the individual Hall to voltages. The output from NAND gates 206–208 are aplied as one input to NAND gates 209–211 and 213. The output of NAND gates 206–208 are also applied as an input to inverting NAND gates 214–216. The outputs of NAND gates 214–216 are one inputs to a set of three NAND gates 217–219.

The other inputs to NAND gates 217–219 are from NAND gates 207, 208 and 206 respectively which rpresent the $Q_3$, $Q_5$ Hall voltages.

The other input to NAND gates 209, 211 and 213 are respectively from NAND gates 215, 216 and 214 which represent the inverse of hall probe voltages $Q_3$, $Q_5$ and $Q_1$. The outputs from NAND gates 215, 216 and 214 are therefore negative when the flux adjacent windings $W_3$, $W_5$ and $W_1$ is high and positive when the flux is low (i.e., $\overline{3}$, $\overline{5}$, $\overline{1}$.) As a result, NAND gates 209, 211 and 213 produce a negative output when both inputs are positive, i.e., for the flux position combinations 1 · $\overline{3}$, 3 · $\overline{5}$, and 5· 1. The outputs of NAND gates 217, 218 and 219 go negative when the outputs from NAND gates 207 and 214 are both positive in the case of NAND gate 217; when NAND gates 208 and 215 go positive in the case of NAND gate 218; and when NAND gates 206 and 216 go positive in the case of NAND gate 219. Thus, the outputs of NAND gates 217, 218 and 219 go positive when both inputs are positive, i.e., for the flux position combination $\overline{3}$-1, $\overline{5}$-3, and 1 ·$\overline{5}$. The output from this array of NAND gates is applied to the NAND gates 220–226 to produce a positive output enabling signal whenever its associated NAND gate 209 etc. goes negative. Thus, the output of NAND gate 220 is positive when the Hall probe voltage indicates that the flux is high adjacent to armature winding $W_1$ but not armature winding $W_3$ (i.e., 1 · $\overline{3}$). NAND gate 221 is positive when the Hall probe voltage indicates that the flux density is high adjacent to winding $W_3$ but not winding $W_1$ (i.e., 3 ·$\overline{1}$). The outputs of NAND gates 220 and 221 may therefore be used respectively to trigger the Number 4 SCR's in the positive bank and the Number 1 SCR's in the negative bank in the case of NAND gate 220 and the Number 1 SCR's in the positive bank and the Number 4 SCR' s in the negative bank in the case of NAND gate 221.

NAND gates 223 and 224 are positive respectively when the Hall probes indicate the flux is high adjacent to winding $W_3$ but not winding $W_5$ (i.e., 3·$\overline{5}$) in the case of NAND gate 223 and high adjacent to winding $W_5$ but not winding $W_3$ (i.e., 5 · $\overline{3}$) in the case of NAND gate 224. NAND gate 224 is the Number 3 SCR in the negative bank on the output from NAND gate 224 is utilized to enable the Number 3 SCR's in the positive bank and the Number 6 SCR's in the negative bank.

Similarly, the output of NAND gates 225 and 226 go to positive when the Hall probes indicate the flux is high adjacent to winding $W_5$ but not winding $W_1$ (i.e., 5 · $\overline{1}$) in the case of NAND gate 225 and high adjacent to winding $W_1$ but not winding $W_5$ (i.e., 1 · $\overline{5}$) in the case of NAND gate 226. The outputs of these two NAND gates may therefore be utilized in the case of NAND gate 225 to enable the Number 2 SCR's in the positive banks and the Number 5 SCR's in the negative banks while the output of NAND gate 226 enables Number 5 SCR's in the positive bank and the Number 2 SCR's in the negative bank.

It will be seen from the foregoing that the Rotor Position Logic Network selectively enable the individual SCR's in the various banks whenever the Hall probe voltage indicates that the flux density adjacent to a particular winding is maximum but only if the flux density adjacent to the winding which is to have current transferred to it next is low. As a consequence, current flow is controlled so that current can flow into only winding at a time and out of one winding at a time in spite of the fact that there are intervals due to the 120° phase displacements when the flux is high at both windings. The enabling signals for the various SCR's are applied simultaneously to all of rhe SCR's associated with that winding. The particular SCR that is fired to supply current into or out of the winding is controlled not only by the SCR enabling voltage but also by the phase enabling voltage. For example, if the output of one of the NAND gates from the Rotor Position Logic Network indicates that the Number 1 SCR in the positive bank and the Number 4 SCR in the negative bank is to be fired, all of the Number 1 SCR's and all of the positive banks are enabled as well as all of the Number 4 SCR's in the negative banks. However, only one Number 1 SCR in a positive bank and one Number 4 in the negative bank is fired since only one supply voltage phase is positive to allow firing of the Number 4 negative SCR and only one supply voltage phase is negative to allow firing of the Number 1 positive SCR. Thus, current flow into and out of the armature windings are controlled by the phase enabling signal, the current level error signal and the rotor position signal which controls the particular armature winding to which current is to be supplied at a given time.

The supply of current to the individual armature windings in the dynamoelectric machine may be either from a single phase of the supply voltage or from a plurality of the supply voltage phases. The manner in which current is supplied either from a single or from all phases of the supply voltage during any given interval is a function of the speed of the machine. It will be obvious that at low machine speed the relative motion of the rotor and hence the rate at which current must be transferred between armature windings is low with respect to the supply frequency. For example, at approximately 100 RPM with a 14 pole pair machine, the current is transferred between the windings approximately 25 times per second. The supply voltage frequency, on the other hand, is approximately 400 Hz. Hence, the supply voltage goes through approximately 20 cycles each time that current is transferred from one winding to the other. Consequently, the current flowing in any given winding during this time interval will be supplied by all of the phases. That is, if Phase A goes through the positive cycle, the SCR in one of the negative banks is enabled to supply current to one of the windings and then the current supply is shifted to Phase B and then Phase C and back to Phase A until current is transferred to the next winding. As the speed of the machine increases, so that the rotational speed of the rotor and the frequency of the counter EMF approaches and exceeds the supply frequency a single supply voltage phase will then transfer current to a plurality of windings.

It will be apparent from the foregoing that a starter generator system has been described in which a single dynamoelectric machine is operated both as a brushless D.C. motor in the starting mode and as a synchronous A.C. generator in the generating mode without requiring any changes in machine structure or connections. Common phase controlled rectifier banks are utilized to supply current to the machine armature windings during motor operation and is utilized as a frequency converting network to convert the varying frequency generator output to a constant frequency output during the generating mode. During starting operation the rectifier banks are controlled from rotor sensing and logic networks to switch current from a constant frequency supply to the various windings in the proper sequence. In the generating mode the rectifier banks are controlled from the generator supply and a reference wave source to control the firing angles to produce a constant frequency output. The control networks for the rectifier banks are selectively actuated as a function of machine operational mode so that the supply voltages and the rotor position networks are coupled to the rectifier banks in the starting mode and are disconnected and the reference wave sources are connected to the rectifier banks when the machine reached a speed at which the system converts to the generating mode. A maximum commonality of parts and components is thus achieved as well as maximum flexibility and utility.

While a particular embodiment of the invention has been illustrated and described, it will be apparent that various modifications thereof may obviously be made in the various instrumentalities and arrangements described without departing from the true spirit and scope of the invention as defined in the appended claims.

What is claimed as new and desired to be secured by Letters Patent of the United States is:

1. In a starter-generator system, the combination of:
   a. a dynamoelectric machine for operation both as a brushless DC motor and as an AC generator.
   b. cycloconverter means coupled to said machine for selectively supplying current to the machine armature windings during motor operation and for converting the frequency of the output from the machine to provide a constant frequency output from the machine during generator operation, said cycloconverter means including banks of oppositely poled, phase controlled, gated switching devices,
   c. means to operate said dynamoelectric machine as a brushless DC motor including:
      1. a source of polyphase alternating supply voltage coupled to said banks of switching devices to drive current selectively through said gated switching devices,
      2. means for sensing the rotor position of said dynamoelectric machine and for gating selected ones of said switching devices in sequence to permit current flow in selected armature windings as a function of rotor position so that current flow is in the armature winding having high flux associated therewith to produce positive torque,
      3. means responsive to the phase of the supply voltage for producing gating signals which have durations that are respectively proportional to the intervals that the supply voltage phases are positive and negative relative to the preceding phase in the polyphase supply voltage sequence for gating selected ones of said switching devices in sequence only if the phase of the alternating polyphase supply voltage is proper and the rotor position is proper,
   d. a source of constant frequency reference waves.
   e. comparator means for comparing the reference frequency waves with the output voltage from said dynamoelectric machine,
   f. means for converting the system from the motoring to the generating mode including,
      1. means responsive to the speed of the dynamoelectric machine for disconnecting the supply voltage, the rotor position and supply phase gating means from the banks of switching devices of said cycloconverters when the machine reaches a predetermined speed at which the machine is to operate as a generator,
      2. means responsive to the speed of the dynamoelectric machine for coupling the output from said comparator means to the banks of switching devices for said cycloconverter means at said predetermined speed to gate said switching means and to control the point in the phase of the output voltage from the dynamoelectric machine at which the switching devices conduct in response both to the output voltage from said dynamoelectric machine and said reference wave signal to supply a constant frequency alternating output from the system when the system is converted to the generating mode.

2. The starter-generator system according to claim 1 wherein said rotor position gating means includes means for sensing said rotor pole position and for producing a polyphase signal proportional to the pole flux means for comparing said polyphase signals, and means for producing a gating signal when the pole flux adjacent a given armature winding is high but the flux adjacent the next armature winding phase is low.

3. The starter-generator according to claim 1 wherein said cycloconverter means includes three cycloconverters each of which includes two banks of oppositely poled gated switches, each bank including a number of switches equal to the number of windings in the armature of said dynamoelectric machines, a three phase supply voltage, each phase of the supply voltage being coupled to different one of said cycloconverters during motor operation of the dynamoelectric machine.

4. The starter-generator according to claim 1 wherein said supply phase responsive gating means includes means for generating a first set of gating signals in response to the individual supply phases which have a duration equal to the interval that each phase is positive with respect to the preceding phase, and a second set of gating signals which have a duration equal to the interval that each phase is negative with respect to the preceding phase, said first set of gating signals being impressed on one bank of each of the cycloconverters and the other set of gating signals being applied to the oppositely poled bank in each of the cycloconverters to enable the switches in the respective banks.

5. The starter generator according to claim 4 wherein said means for generating said gating signals includes means for producing the integrals of the line-to-line supply voltages, means to subtract the integrals of the line-to-line voltages to produce a first set of gating signals which have a duration equal to the interval that each phase is positive with respect to the preceding phase, means to invert the first set of gating signals to produce a second set of gating signals which have a duration equal to the duration that each phase is negative with respect to the preceding phase.

6. The starter-generator according to claim 5 wherein the duration of the said sets of gating signals is varied as a function of the machine current, including means to produce an error signal proportional to current level, means to compare said error signal and each of the integrals of the line-to-line voltages to produce a control signal for each supply phase, means responsive to said control signal to vary the duration of said sets of gating signals.

7. The starter-generator according to claim 6, including a plurality of gating means, means to apply a signal from each of the sets of gating signals from said subtracting means, as one input to each of said gating means, means to apply one of the control signals as the other input to each of said gating means whereby the output of each of said gating means is a gating signal having a duration which varies both with the supply phase and the machine current level.

8. The starter-generator according to claim 2 wherein said rotor position gating means includes a Permanent Magnet Generator mounted on the same shaft as said dynamoelectric machine and having a rotor with the same number of poles as said hynamoelectric machine, a plurality of Hall probes mounted in the air gap of the said Permanent Magnet Generator to produce phase displaced output voltages indicating the pole position of the dynamoelectric machine rotor, means responsive to the phase displaced voltages to produce gating voltages when the rotor position indicates that the flux from the rotor poles is high adjacent to an armature winding but is low adjacent the next armature winding.

9. A starter-generator system for a jet engine in which a dynamoelectric machine is initially operated as a motor to provide starting torque for a jet engine and is driven as an AC generator by the engine after it reaches idling speed, the combination of:
 a. a dynamoelectric machine having a plurality of armature windings, and field windings on a rotor mounted on a shaft coupled to a jet engine,
 b. a plurality of cycloconverter means associated with said armature windings for selectively supplying current to the machine armature windings subjected to high flux levels from the field poles to produce torque to drive the jet engine during motor operation for converting the output from said machine armature to a constant frequency output signal during generator operation, each of said cycloconverters including banks of oppositely poled, phase controlled, gated rectifiers,
 c. a source of three phase alternating supply voltage coupled to said cycloconverters,
 d. means for sensing the rotor position of said dynamoelectric machine to determine the flux levels at the armature windings, means to produce gating signals for gating selected ones of said rectifiers in sequence to permit current to flow in those armature windings having a high flux level to produce positive torque,
 e. means responsive to the phase of the supply voltage for producing enabling signals for the individual rectifier banks to permit gating of the rectifiers in the individual rectifier banks only if the polarity of the supply phase is proper and the rotor position is correct,
 f. a source of constant frequency reference waves,
 g. means responsive to the said reference waves and the output from the armature windings from said dynamoelectric machine when driven as a generator to produce switching signals for said rectifiers to render them conductive during selected points in the phase of the output alternation from the dynamoelectric machine,
 h. means responsive to the speed of the machine to disable the supply voltage, phase responsive gating means and the rotor position gating means when the machine reaches a predetermined speed, and,
 i. means responsive to the machine speed for coupling the means for producing switching signals to said rectifier banks when the machine reaches a predetermined speed to render the switches conductive during selected points in the phase of the output alternations from the machine to convert the alternations which vary in frequency to a constant frequency.

10. The starter-generator according to claim 9 wherein said rotor position gating means includes means for sensing the rotor pole position of said dynamoelectric machine and for producing a polyphase signal proportional to the pole flux adjacent the armature windings, means for processing said polyphase rotor position signals and producing a gating signal having a duration equal to the interval when the flux is high adjacent to a given armature winding but terminates when the rotor pole has moved sufficiently so that the flux adjacent the next winding also becomes high.

11. The starter-generator according to claim 10 wherein said dynamoelectric machine has a six phase stator winding, and each oppositely poled rectifier bank of each cycloconverter includes six rectifiers, each rectifier in each bank being connected to a different armature winding.

12. The starter-generator according to claim 11 wherein said supply phase responsive gating means includes means for generating a first set of gating signals in response to the individual supply phases which have a duration equal to the interval that each phase is positive with respect to the preceding phase, and a second set of gating signals which have a duration equal to the interval that each phase is negative with respect to the preceding phase, said first set of gating signals being impressed on one bank of each of the cycloconverters and the other set of gating signals being applied to the oppositely poled bank in each of the cycloconverters, to enable the switches in the respective banks.

13. The starter-generator according to claim 12 wherein said means for generating said gating signals includes means for producing the integrals of the line-to-line supply voltages, means to subtract the integrals of the line-to-line voltages to produce a first set of gating signals which have a duration equal to the interval that each phase is positive with respect to the preceding phase, means to invert the first set of gating signals to produce a second set of gating signals which have a duration equal to the duration that each phase is negative with respect to the preceding phase.

14. The starter-generator according to claim 13 wherein the duration of the said sets of gating signal is varied as function of the machine current, including means to produce an error signal proportional to current level, means to compare said error signal and each of the integrals of the line-to-line voltages to produce a control signal for each supply phase, means responsive to said control signals to vary the duration of said sets of gating signals.

* * * * *